(12) United States Patent
Fujieda

(10) Patent No.: US 6,816,140 B2
(45) Date of Patent: Nov. 9, 2004

(54) DISPLAYING DEVICE AND DISPLAYING METHOD AND MANUFACTURING METHOD OF THE DEVICE

(75) Inventor: Ichiro Fujieda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/013,263

(22) Filed: Dec. 7, 2001

(65) Prior Publication Data

US 2002/0140879 A1 Oct. 3, 2002

(30) Foreign Application Priority Data

Dec. 12, 2000 (JP) ...................................... 2000-377020

(51) Int. Cl.⁷ ................................................ G09G 5/00
(52) U.S. Cl. ........................................ 345/87; 345/205
(58) Field of Search ........................... 315/169.1, 169.3; 345/205, 206, 76, 92

(56) References Cited

U.S. PATENT DOCUMENTS 5,657,056 A * 8/1997 Izumi et al. ................. 345/205
6,476,419 B1 * 11/2002 Yasuda ......................... 257/72

FOREIGN PATENT DOCUMENTS

| JP | 59-148030 | 8/1984 |
| JP | 62-32419 | 2/1987 |
| JP | 1-185692 | 7/1989 |
| JP | 2000-29398 | 1/2000 |
| KR | 1995-0009845 | 8/1995 |
| WO | WO 95/01584 | 1/1995 |

* cited by examiner

*Primary Examiner*—David Vu
(74) *Attorney, Agent, or Firm*—Scully, Scott, Murphy & Presser

(57) ABSTRACT

A displaying device, which can reduce the power consumption, compared with a conventional displaying device in which the reduction of the power consumption is difficult because light is extracted from each of light emitting elements in time series, and also can prevent a displayed image from deteriorating caused by light entering from the outside or a light loss in a waveguide array, is provided. In the displaying device, a light emitting array controls each of light emitting elements. A waveguide array is formed by patterning a photosensitive resin formed on a supporting substrate having a light absorbing layer. A light extracting section extracts light at the same time form a predetermined selected region of the plural light emitting elements. The light extracting section also provides an antireflection layer on the surface facing to an observer. The extracting efficiency at the light extracting section is corrected corresponding to a light loss in the waveguide array. The light extracting section uses an optical material whose refractive index is changed by an external electric field.

74 Claims, 14 Drawing Sheets

10: LIGHT EMITTING MEANS
11: LIGHT EMITTING ELEMENT
12: OPTICAL AXIS
20: WAVEGUIDE ARRAY
21: WAVEGUIDE
22: SUPPORTING SUBSTRATE
30: LIGHT EXTRACTING MEANS
31: LIQUID CRYSTAL LAYER
32: LIQUID CRYSTAL SEALING MATERIAL
33: TRANSPARENT SUBSTRATE
34: ELECTRODE
38: TERMINAL
40: LIGHT REFLECTING MEANS

120: TRANSPARENT PROTECTION PANEL
121: OPTICAL FIBER WITHOUT CLAD
 (CROSS-SECTION IS CYLINDRICAL)
122: LIQUID CRYSTAL LAYER
123: OPTICAL FIBER WITHOUT CLAD
 (CROSS-SECTION IS RECTANGULAR)
124: SUBSTRATE FOR OPTICAL FIBERS
125: FIRST ELECTRODE
126: SECOND ELECTRODE
127: OPTICAL ADHESIVE

140: THIRD ELECTRODE
141: FOURTH ELECTRODE
142: PROTECTION PANEL
144: OPTICAL FIBER WITHOUT CLAD
    (CROSS-SECTION IS RECTANGULAR)
146: SUBSTRATE FOR OPTICAL FIBERS
148: LIQUID CRYSTAL LAYER
150: LIGHT ABSORBING LAYER
152: FIFTH ELECTRODE

10: LIGHT EMITTING MEANS
11: LIGHT EMITTING ELEMENT
12: OPTICAL AXIS
20: WAVEGUIDE ARRAY
21: WAVEGUIDE
22: SUPPORTING SUBSTRATE
30: LIGHT EXTRACTING MEANS
31: LIQUID CRYSTAL LAYER
32: LIQUID CRYSTAL SEALING MATERIAL
33: TRANSPARENT SUBSTRATE
34: ELECTRODE
38: TERMINAL
40: LIGHT REFLECTING MEANS

FIG. 5

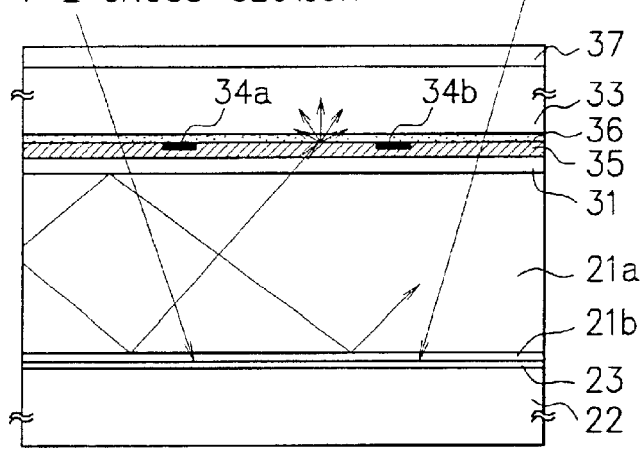

Y-Z CROSS-SECTION

21a: WAVEGUIDE CORE
21b: WAVEGUIDE CLAD
22: SUPPORTING SUBSTRATE
23: LIGHT ABSORBING LAYER
31: LIQUID CRYSTAL LAYER
33: TRANSPARENT SUBSTRATE
34a: FIRST ELECTRODE
34b: SECOND ELECTRODE
35: ALIGNMENT LAYER
36: LIGHT SCATTERING LAYER
37: ANTIREFLECTION LAYER

FIG. 6

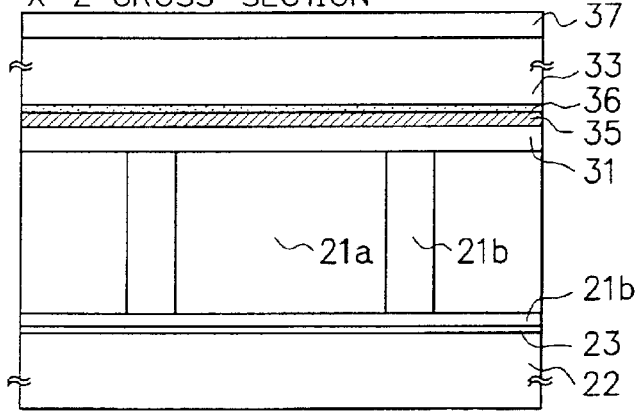

X-Z CROSS-SECTION

21a: WAVEGUIDE CORE
21b: WAVEGUIDE CLAD
22: SUPPORTING SUBSTRATE
23: LIGHT ABSORBING LAYER
31: LIQUID CRYSTAL LAYER
33: TRANSPARENT SUBSTRATE
34a: FIRST ELECTRODE
34b: SECOND ELECTRODE
35: ALIGNMENT LAYER
36: LIGHT SCATTERING LAYER
37: ANTIREFLECTION LAYER

BRANCHING  BRANCHING
EXAMPLE 1  EXAMPLE 2

30: LIGHT EXTRACTING MEANS
30a: DISPLAYING REGION
31: LIQUID CRYSTAL LAYER
32: LIQUID CRYSTAL SEALING MATERIAL
33: TRANSPARENT SUBSTRATE
34: ELECTRODE

60: TRANSPARENT SUBSTRATE
61: LIGHT SHIELDING LAYER
62: BARRIER LAYER
63: CHANNEL REGION OF TFT
64: SOURCE-DRAIN REGION OF TFT
65: GATE INSULATING LAYER
66: GATE ELECTRODE
67: INSULATING LAYER
68: SOURCE-DRAIN ELECTRODE
69: PLANARIZATION LAYER
70: TRANSPARENT ELECTRODE
71: ORGANIC EL LAYER
72: OPAQUE ELECTRODE
73: SEALING LAYER

10: LIGHT EMITTING MEANS
11: LIGHT EMITTING ELEMENT
12: OPTICAL AXIS
20: WAVEGUIDE ARRAY
21: WAVEGUIDE
22: SUPPORTING SUBSTRATE
30: LIGHT EXTRACTING MEANS
31: LIQUID CRYSTAL LAYER
32: LIQUID CRYSTAL SEALING MATERIAL
33: TRANSPARENT SUBSTRATE
34: ELECTRODE
40: LIGHT REFLECTING MEANS
50: LIGHT ABSORBING MEANS

30: LIGHT EXTRACTING MEANS
30a: DISPLAYING REGION
30b: GRAY LEVEL CONTROLLING REGION
31: LIQUID CRYSTAL LAYER
32: LIQUID CRYSTAL SEALING MATERIAL
33: TRANSPARENT SUBSTRATE
34: ELECTRODE

F I G. 17
10: LIGHT EMITTING MEANS
20: WAVEGUIDE ARRAY
30: LIGHT EXTRACTING MEANS
40: LIGHT REFLECTING MEANS
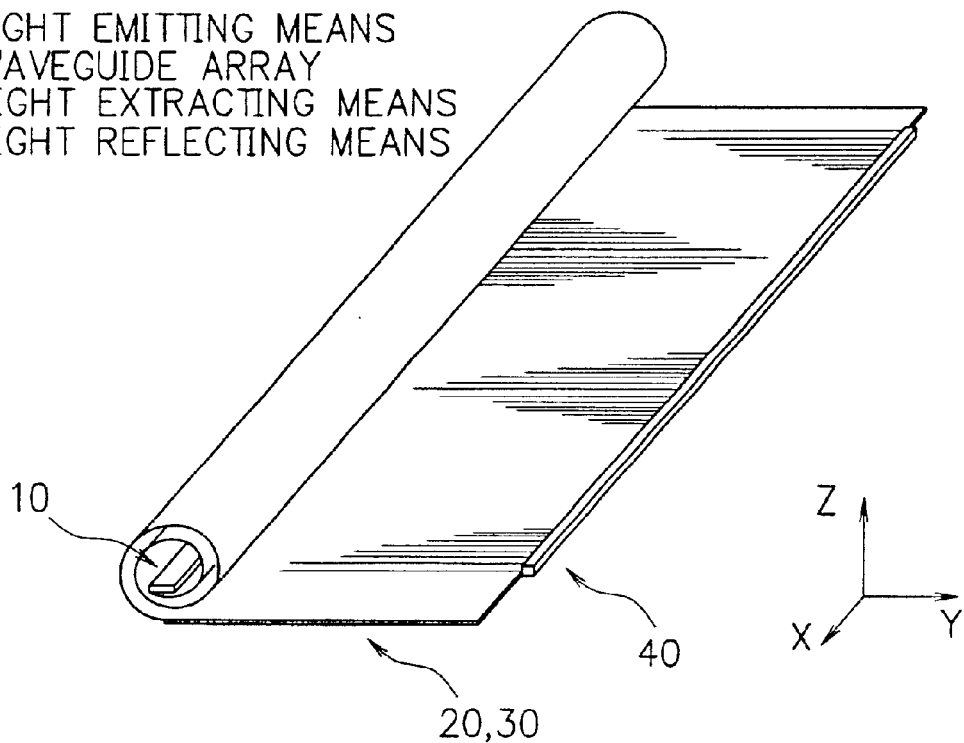
F I G. 18
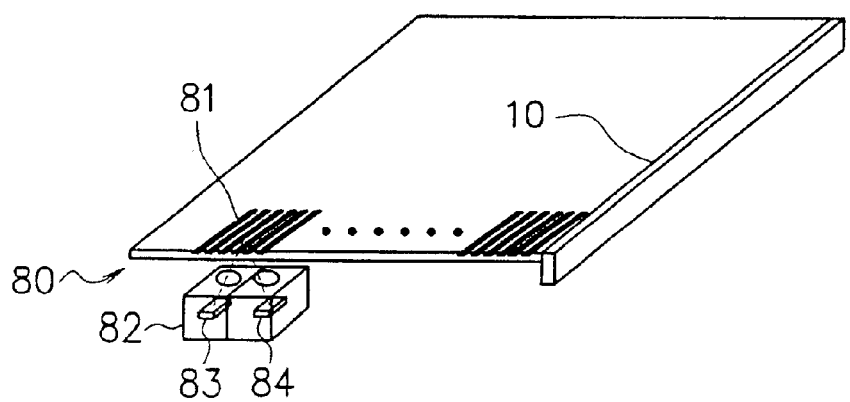

F I G. 19
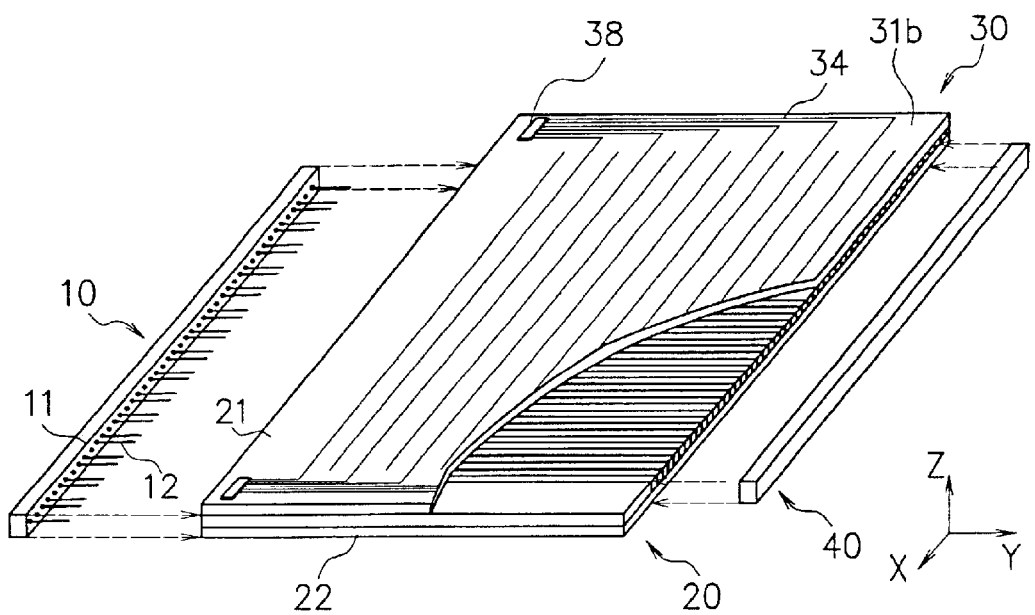
10: LIGHT EMITTING MEANS
11: LIGHT EMITTING ELEMENT
12: OPTICAL AXIS
20: WAVEGUIDE ARRAY
21: WAVEGUIDE
22: SUPPORTING SUBSTRATE
30: LIGHT EXTRACTING MEANS
31b: POLYMERIC MATERIAL LAYER
(ELECTRIC FIELD ALIGNMENT POLYMER
OR LIQUID CRYSTAL POLYMER)
34: ELECTRODE
38: TERMINAL
40: LIGHT REFLECTING MEANS

DISPLAYING DEVICE AND DISPLAYING METHOD AND MANUFACTURING METHOD OF THE DEVICE

BACKGROUND OF THE INVENTION

The present invention relates to a displaying device and a displaying method, and a manufacturing method of the device, which is a flat type displaying device used for such as personal digital assistants (PDA), a mobile communication terminal, a personal computer (PC), a television (TV) set, in particular, in which waveguides being a thin type, having light weight, and whose manufacturing cost is low, are used.

DESCRIPTION OF THE RELATED ART

A liquid crystal display (LCD) has been used as a displaying device for a PDA, a mobile communication terminal, a PC, a TV set, a video game set, and so on. Especially, a thin film transistor (TFT)-LCD, which drives each liquid crystal cell by using a TFT provided at each pixel, has been widely used, because an image can be displayed in high resolution and high speed response.

However, since the manufacturing processes of the TFT are complicated, the larger its displaying screen is, the higher its manufacturing cost is. Furthermore, the size of the screen of the LCD is limited to a certain size depending on performance of the TFT manufacturing equipment such as spattering equipment, chemical vapor deposition (CVD) equipment, and lithography equipment.

In order to solve these problems, Japanese Patent Application Laid-Open No. 2000-29398 discloses "Flat Panel Display using Waveguides". In this patent application, light from a light source is attenuated corresponding to a video signal. And the attenuated light is inputted to plural waveguides arrayed regularly. And an image is displayed by extracting light from designated places of the waveguides corresponding to the video signal repeatedly.

Referring now to drawings, this conventional flat panel display using waveguides is explained. FIG. 1 is a block diagram showing the conventional flat panel display disclosed in the Japanese Patent Application Laid-Open No. 2000-29398. As shown in FIG. 1, a video signal is inputted to a driving unit 130, and a control signal $C_1$ is outputted to a gray level controlling unit 134 and a control signal $C_2$ is outputted to a display panel 132 from the driving unit 130. Light from a light source 136 is attenuated according to the control signal $C_1$ and the attenuated light is inputted to the display panel 132. The display panel 132 consists of waveguides and a light extracting means for extracting light from these waveguides.

FIG. 2 is a sectional view showing the display panel 132 shown in FIG. 1. Optical fibers without clad 123, whose cross-section is rectangle, are regularly arrayed on a substrate for optical fibers 124. As described above, these optical fibers without clad 123 do not have clad which is different from conventional optical fibers. And a liquid crystal layer 122 is formed on the upper surface of these optical fibers without clad 123. The liquid crystal layer 122 changes its refractive index when a voltage is applied.

Optical fibers without clad 121, whose cross-section is cylindrical, are arrayed regularly in the upper part of the liquid crystal layer 122. And a transparent protection panel 120 is formed on the upper surfaces of the optical fibers without clad 121. An optical adhesive 127 is disposed between the transparent protection panel 120 and the optical fibers without clad 121. Further, first electrodes 125 are disposed on the lower surface of the transparent protection panel 120, and second electrodes 126 are disposed on the lower surface of the substrate for optical fibers 124. Voltages are applied to the first electrodes 125 and the second electrodes 126 respectively. Alternatively, the second electrodes 126 can be disposed on the lower surface of the liquid crystal layer 122 or on the lower surface of the optical fiber without clad 123.

Next, referring to FIGS. 1 and 2, an operation of the conventional flat panel display using waveguides is explained. The light from the light source 136 is controlled (attenuated) by the gray level controlling unit 134 according to a control signal $C_1$. And this attenuated light is inputted to an optical fiber 123. A control signal $C_2$ determines a position where the light is entered. When there is no potential difference between the first electrode 125 and the second electrode 126, this light is propagated in the optical fiber without clad 123 by repeating the total reflection inside.

When a potential difference is applied between the designated first and second electrodes 125 and 126 selected by the control signal $C_2$, the refractive index of the liquid crystal layer 122 becomes high. And as shown in FIG. 2, the light, which does not satisfy the condition for the total reflection, is extracted from the designated optical fiber without clad 123. And the direction of the extracted light is changed by the refraction at the boundary of the optical fiber without clad 121, and the light reaches an observer (not shown). The operation mentioned above is repeated for all of the points on the surface of the display panel 132, and an image is displayed on the display panel 132.

FIG. 3 is a sectional view showing the gray level controlling unit 134 shown in FIG. 1. As shown in FIG. 3, in the gray level controlling unit 134, optical fibers without clad 144 whose cross-section is rectangular are arrayed on a substrate for optical fibers 146, and a protection panel 142 having third electrodes 140 and fourth electrodes 141 is disposed in the upper surface of the optical fibers without clad 144. And a liquid crystal layer 148, a light absorbing layer 150, and a fifth electrode 152 are layered in a part of the substrate for optical fibers 146 at the position where the substrate for optical fibers 146 contacts with the optical fibers without clad 144.

Next, referring to FIGS. 1 and 3, an operation of the gray level controlling unit 134 is explained. When voltages are not applied to the third electrode 140, the fourth electrode 141, and the fifth electrode 152, light inputted to the optical fiber without clad 144 from the light source 136 repeats the total reflection in the optical fiber without clad 144 and inputted to the display panel 132 with almost no attenuation. And, for example, when a potential difference is applied between the fourth electrode 141 and the fifth electrode 152, the refractive index of the liquid crystal layer 148 becomes high, and the condition of the total reflection is broken at the boundary of the optical fiber without clad 144.

Light not satisfying the condition for the total reflection is inputted to the liquid crystal layer 148 and is absorbed by the light absorbing layer 150. As mentioned above, the amount of light supplied to the display panel 132 can be controlled by the gray level controlling unit 134 based on whether voltages are applied or not to the gray level controlling unit 134.

As mentioned above, the conventional flat panel display using waveguides consists of the light source 136, the gray level controlling unit 134, the display panel 132, and the driving unit 130. And the display panel 132 includes the waveguides and the light extracting means, and the driving unit 130 gives control signals to the gray level controlling unit 134 and the display panel 132. In this, an important role to extract light propagating in the waveguides in the display panel 132 is executed by a specific material. The refractive index of this specific material must be changed by application of a voltage. In the conventional flat panel display using waveguides, as mentioned above, the liquid crystal is used as this material.

And there is also another conventional displaying device having waveguides and a light extracting means. Japanese Patent Application Laid-Open No. SHO 59-148030 discloses "Optical Fiber Displaying Device". In this patent application, nitroglycerin films are formed at a part of an optical fiber with clad, and two transparent electrodes are disposed at the nitroglycerin films in a state that the two transparent electrodes face each other with the optical fiber between them. And lead wires are connected to the transparent electrodes. In this patent application, when a voltage is applied to the transparent electrodes, the refractive index of the clad is changed by Kerr effect, and light is extracted from this part of the clad.

Japanese Patent Application Laid-Open No. HEI 1-185692 discloses "Flat Display Panel". In this patent application, a unit, which serves both as waveguides and as a light extracting means, is provided. For example, a supperlattice structure, in which two kinds of thin films such as amorphous silicon (a-Si) and amorphous silicon nitride (a-SiN) are stacked together alternately, functions as a core. And two transparent electrodes, which face with each other with the core between them, function as clad. And the refractive index of the core is changed by applying a voltage to the transparent electrodes, and the light propagating inside the core is extracted.

However, there are following common problems in the conventional displaying devices using waveguides mentioned above.

First, since light is extracted from each of the waveguides in time series, the operating frequency of the driving unit is high, and the reduction of its power consumption is difficult. For example, in case that a color image with a video graphic array (VGA) format (the number of pixels is 640×480×3= 921,600) is displayed at the frame frequency of 60 Hz, time needed to extract light from each pixel becomes 1/(60×640× 480×3) at maximum, that is, 18 n sec. And the driving unit is required to apply a voltage to electrodes of each light extracting means at a frequency higher than the frequency corresponding to 18 nsec. The power consumption of the circuit of the driving unit is proportional to the operating frequency, therefore, the frequency is increased in proportion to the number of pixels. If light can be extracted from waveguides in parallel, the operating frequency of the driving unit can be decreased dramatically. For example, in the conventional example mentioned above, in which a VGA format image mentioned above is displayed at the frequency of 60 Hz, the operating frequency can be reduced by a factor of 1/680 at maximum. However, the prior arts mentioned above do not teach how to reduce their power consumption.

Second, when ambient light inputted to the waveguide is reflected on the boundary of either the waveguides or the light extracting means, the reflected light is added to the light corresponding to an original video signal. Therefore, there is a problem of the contrast deterioration.

Third, if there is a remarkable light loss caused by self-absorption in the waveguide, a gradation pattern appears in the displayed image meant to be all white. However, the prior arts do not teach to solve this problem.

Fourth, in the conventional displaying devices, the waveguides, the light extracting means, and the gray level controlling unit are required independently. Therefore, there are problems that their manufacturing cost becomes high and that the reliability is deteriorated. However, the prior arts do not teach how to solve these problems.

Fifth, if the waveguides and the light extracting means can be contained in a small container when they are not used, a displaying device with excellent portability can be realized. However, the conventional displaying devices do not teach anything how this can be realized.

Next, specific problems to each of the conventional displaying devices mentioned above are explained in detail. In the flat panel display using waveguides in the Japanese Patent Application Laid-Open No. 2000-29398, there are following problems.

First, its manufacturing problems are explained. It consumes time and labor to array many optical fibers regularly and precisely. In order to control a light emitting angle, it is important to position optical fibers precisely. However, the diameter of the optical fiber has some tolerance. This tolerance is accumulated when many optical fibers are arrayed. The optical fibers having a rectangular cross-section, which work as the waveguides, are arrayed at concave parts formed in the substrate for optical fibers. However, gaps may exist between the optical fibers and the concave parts, because, in some cases, their shapes are not matched, or the tolerances exist in them. Therefore, the waveguides contact with materials (gaps) whose refractive index is different from the waveguides, and the optical characteristics, being essential to the waveguides, may be deteriorated. As mentioned above, there are the manufacturing problems in the processes arraying many optical fibers.

Second, its problem in driving the display is explained. It is necessary to apply a sufficient high voltage, in order to align liquid crystal molecules so that the refractive index of the liquid crystal layer changes. However, in the structure disclosed in the Japanese Patent Application Laid-Open No. 2000-29398, it is necessary to apply an additional bias in series across the optical fibers, which are inserted for changing the courses of light propagating by refraction.

According to FIG. 2 in this patent application, the diameter of the optical fiber is equivalent to the pixel pitch of the display. For example, in a case of a color displaying device with 200 ppi (pixel per inch resolution, this pixel pitch is about 30 $\mu$m. On the other hand, it is known that 3 to 10 bias V is necessary for aligning liquid crystal molecules in a 2 to 5 $\mu$m thickness in a conventional LCD. Therefore, in this application, at least several 10 V voltages are necessary to realize the 200 ppi resolution, as a result, it is difficult to drive the display with a low voltage for this application. That is, the lower the resolution is, the higher bias voltage is required. Consequently, it is difficult to use this display for instruments, which need low power consumption, such as a PDA, a note type PC.

Next, in the optical fiber displaying device at the Japanese Patent Application Laid-Open No. SHO 59-148030, there is a following problem of manufacturing. For this structure, complicated processes, such as forming the nitroglycerin films, connecting lead wires to the transparent electrodes, are required. Therefore, the manufacturing cost becomes high, and its mass production is problematic.

Further, in the flat display panel disclosed in the Japanese Patent Application Laid-Open No. HEI 1-185692, there is a following manufacturing problem. In this structure, it requires time and labor to form the super-lattice structure of cores. Consequently, its manufacturing cost becomes high.

SUMMARY OF THE INVENTION

It is therefore an object of the present invention to provide a displaying device and a displaying method and a manufacturing method of the displaying device, in which an image having high contrast can be watched clearly and the displaying device can be driven by low power consumption.

In more detail, the present invention provides a displaying device, a displaying method, and a manufacturing method of the displaying device, which can be driven by a direct current (DC) voltage being less than 5V.

And, the present invention provides a displaying device, a displaying method, and a manufacturing method of the displaying device, which can be manufacture by a low cost.

Furthermore, the present invention provides a displaying device, a displaying method, and a manufacturing method of the displaying device, which can be contained in a small container whose vertical direction is long when the displaying device is not used.

According to a first aspect of the present invention, there is provided a displaying device. The displaying device provides a light emitting array that emits light of one line of a displaying image by plural light emitting elements, a waveguide array that propagates light inputted from the light emitting array from one end to the other end of a displaying region, and a light extracting section that extracts light propagating in the waveguide array from an arbitrarily selected region.

According to a second aspect of the present invention, in the first aspect, the arbitrarily selected region includes at least two or more pixels.

According to a third aspect of the present invention, in the first aspect, the arbitrarily selected region is an arbitrary one line crossing to the propagating direction of the light of the one line emitted from the light emitting array.

According to a fourth aspect of the present invention, in the first aspect, the waveguide array provides at least high refractive index regions and low refractive index regions. And the high refractive index regions are provided corresponding to the number of pixels composing the one line of the light emitting from the light emitting array in a designated array pitch, and the light of the one line emitted from the light emitting array propagates in the corresponding high refractive index regions.

According to a fifth aspect of the present invention, in the first aspect, the waveguide array is formed by a polymeric material.

According to a sixth aspect of the present invention, in the first aspect, the waveguide array further provides a light absorbing layer for absorbing light from the outside on a supporting substrate.

According to a seventh aspect of the present invention, in the first aspect, the waveguide array further provides a supporting substrate made of a polymeric material, a light absorbing layer for absorbing light from the outside formed on the supporting substrate, a low refractive index region formed on the light absorbing layer, and a layer, in which high refractive index regions and low refractive index regions are disposed alternately in a designated pitch, on the low refractive index region.

According to an eighth aspect of the present invention, in the first aspect, the light extracting section provides an antireflection layer for preventing light from the outside from reflecting.

According to a ninth aspect of the present invention, in the first aspect, the light extracting section further provides an optical material layer whose refractive index is changed by an external electric field, and plural electrodes for generating an electric field by selecting a region of the optical material layer.

According to a tenth aspect of the present invention, in the ninth aspect, the plural electrodes are disposed so that a potential difference is generated in a region composing an arbitrary one line crossing to the propagating direction of the light of the one line emitted from the light emitting array.

According to an eleventh aspect of the present invention, in the ninth aspect, the plural electrodes are composed of a pair of stripe-shaped electrodes, and one piece of the stripe-shaped electrodes has plural branches.

According to a twelfth aspect of the present invention, in the ninth aspect, the region where an electric potential is given by the plural electrodes makes light emitted from the light emitting array extract to the outside from the optical material layer through the waveguide array, by changing the refractive index of the optical material layer at the region.

According to a thirteenth aspect of the present invention, in the ninth aspect, the plural electrodes are formed on the same plane surface.

According to a fourteenth aspect of the present invention, in the twelfth aspect, the light extracting section further provides a light scattering layer for scattering the light extracted from the optical material layer.

According to a fifteenth aspect of the present invention, in the ninth aspect, the light extracting section further provides an antireflection layer for preventing light from the outside from reflecting.

According to a sixteenth aspect of the present invention, in the first aspect, the light extracting section corrects the light extracting efficiency at the time when the light is extracted corresponding to a loss of the light in the waveguide array.

According to a seventeenth aspect of the present invention, in the first aspect, the waveguide array and the light extracting section are formed by a flexible material that can be repeatedly rolled up and pulled out, and can be contained in a container.

According to an eighteenth aspect of the present invention, in the seventeenth aspect, the displaying device further provides a detecting section that detects the boundary between the pulled out part being the exposed part from the container and the contained part in the container of the waveguide array and the light extracting section. And the light extracting section extracts light from only a region of the exposed part base on the detected result.

According to a nineteenth aspect of the present invention, in the first aspect, the light emitting array provides organic electro-luminescence (EL) layers for emitting light. And each of the organic EL layers is positioned between a transparent electrode and an opaque electrode.

According to a twentieth aspect of the present invention, in the nineteenth aspect, the light emitting array further provides a transparent substrate, a light shielding layer for shielding light from the outside provided on the transparent substrate, a barrier layer for preventing impurity elements including in the transparent layer from entering other layers provided on the barrier layer, and thin film transistors (TFTs) provided on the barrier layer.

According to a twenty-first aspect of the present invention, in the nineteenth aspect, the light emitting array provides the plural organic EL layers and TFTs for driving the plural organic EL layers corresponding to the number of pixels composing one line of emitting light.

According to a twenty-second aspect of the present invention, in the nineteenth aspect, the light emitting array further provides plural capacitors in which an inputted analog image signal is stored every pixel composing the one line. And when the analog image signal of the one line was stored in the plural capacitors, voltages stored in the capacitors are applied to gate electrodes of the TFTs at the same time, and the organic EL layers emit light of the one line at the same time.

According to a twenty-third aspect of the present invention, in the first aspect, the light emitting array inputs light of three colors R, G, and B to the waveguide array.

According to a twenty-fourth aspect of the present invention, in the first aspect, the light emitting array inputs a corrected image signal to the waveguide array corresponding to a loss of the light in the waveguide array.

According to a twenty-fifth aspect of the present invention, there is provided a displaying device. The displaying device provides a light emitting array that emits light of one line of a displaying image by plural light emitting elements, a waveguide array that propagates light inputted from the light emitting array from one end to the other end of the waveguide array, and a light extracting section that extracts light propagating in the waveguide array from an arbitrarily one line crossing to the propagating direction of one line of the light emitted from the light emitting array. And the light extracting section provides a gray level controlling region which makes a part of light propagating through the waveguide array leak to the outside, and a displaying region from which light controlled at the gray level controlling region is extracted.

According to a twenty-sixth aspect of the present invention, in the twenty-fifth aspect, the light extracting section further provides an antireflection layer for preventing light from the outside from reflecting.

According to a twenty-seventh aspect of the present invention, in the twenty-fifth aspect, the light extracting section further provides an optical material layer whose refractive index is changed corresponding to an electric field from the outside, and plural electrodes for generating an electric field by selecting a region of the optical material layer.

According to a twenty-eighth aspect of the present invention, in the twenty-seventh aspect, the plural electrodes disposed at the gray level controlling region are positioned so that a potential difference is generated at a region of an area based on an inputted digital image signal.

According to a twenty-ninth aspect of the present invention, in the twenty-fifth aspect, the displaying device further provides a light absorbing section for absorbing light leaked from the gray level controlling region.

According to a thirtieth aspect of the present invention, in the twenty-seventh aspect, the plural electrodes disposed at the displaying region are positioned so that a potential difference is generated in a region composing an arbitrary one line crossing to the propagating direction of light of one line emitted from the light emitting array.

According to a thirty-first aspect of the present invention, in the thirtieth aspect, the plural electrodes are composed of a pair of stripe-shaped electrodes, and one piece of the stripe-shaped electrodes has plural branches.

According to a thirty-second aspect of the present invention, in the twenty-seventh aspect, the plural electrodes are formed on the same plane surface.

According to a thirty-third aspect of the present invention, in the twenty-seventh aspect, at the region where the electric potential was given from the plural electrodes, the refractive index of the optical material layer is changed, and the light emitted from the light emitting array is extracted from the optical material layer through the waveguide array to the outside.

According to a thirty-fourth aspect of the present invention, in the twenty-seventh aspect, the light extracting section further provides a light scattering layer for scattering the light extracted from the optical material layer.

According to a thirty-fifth aspect of the present invention, in the twenty-seventh aspect, the light extracting section further provides an antireflection layer for preventing light from the outside from reflecting.

According to a thirty-sixth aspect of the present invention, in the twenty-fifth aspect, the light extracting section corrects the light extracting efficiency at the time when the light is extracted corresponding to a loss of the light in the waveguide array.

According to a thirty-seventh aspect of the present invention, in the twenty-fifth aspect, the light emitting array provides organic EL layers for emitting light. And each of the organic EL layers is positioned between a transparent electrode and an opaque electrode.

According to a thirty-eighth aspect of the present invention, in the thirty-seventh aspect, the light emitting array further provides a transparent substrate, a light shielding layer for shielding light from the outside provided on the transparent substrate, a barrier layer for preventing impurity elements including in the transparent layer from entering other layers provided on the barrier layer, and TFTs provided on the barrier layer.

According to a thirty-ninth aspect of the present invention, in the thirty-seventh aspect, the light emitting array provides the plural organic EL layers and the TFTs for driving the plural organic EL layers corresponding to the number of pixels composing one line of emitting light. And the TFTs are driven from the beginning of the one line in order, and the plural organic EL layers emit light from the beginning of the one line in order.

According to a fortieth aspect of the present invention, in the twenty-fifth aspect, the light emitting array inputs light of three colors R, G, and B to the waveguide array.

According to a forty-first aspect of the present invention, in the twenty-fifth aspect, the light emitting array inputs a corrected image signal to the waveguide array corresponding to a loss of the light in the waveguide array.

According to a forty-second aspect of the present invention, in the twenty-fifth aspect, the waveguide array provides at least high refractive index regions and low refractive index regions. And the high refractive index regions are provided corresponding to the number of pixels composing one line of light emitting from the light emitting array by a designated array pitch, and light of one line emitted from the light emitting array is propagated in the corresponding high refractive index regions.

According to a forty-third aspect of the present invention, in the twenty-fifth aspect, the waveguide array is formed by a polymeric material.

According to a forty-fourth aspect of the present invention, in the twenty-fifth aspect, the waveguide array further provides a light absorbing layer for absorbing light from the outside on a supporting substrate.

According to a forty-fifth aspect of the present invention, in the twenty-fifth aspect, the waveguide array further provides a supporting substrate formed by a polymeric material, a light absorbing layer for absorbing light from the outside provided on the supporting substrate, a low refractive index region formed on the light absorbing layer, and a layer in which high refractive index regions and low refractive index regions are disposed alternately in a designated pitch on the low refractive index region.

According to a forty-sixth aspect of the present invention, in the twenty-fifth aspect, the displaying device further provides a light reflecting section for reflecting light propagated by the waveguide array at the other end of the waveguide array.

According to a forty-seventh aspect of the present invention, in the twenty-fifth aspect, the waveguide array and the light extracting section are formed by a flexible material that can be repeatedly rolled up and pulled out, and can be contained in a container.

According to a forty-eighth aspect of the present invention, in the twenty-fifth aspect, the displaying device further provides a detecting section that detects the boundary between the pulled out part being the exposed part from the container and the contained part in the container of the waveguide array and the light extracting section. And the light extracting section extracts light from only a region of the exposed part base on the detected result.

According to a forty-ninth aspect of the present invention, there is provided a displaying method. The displaying method provides the steps of, emitting light of one line of a displaying image by plural light emitting elements, propagating emitted light from one end to the other end of a displaying region through a waveguide array, and extracting the propagating light from an arbitrarily selected region.

According to a fiftieth aspect of the present invention, in the forty-ninth aspect, the arbitrarily selected region includes at least two or more pixels.

According to a fifty-first aspect of the present invention, in the forty-ninth aspect, the arbitrarily selected region is an arbitrary one line crossing to the propagating direction of one line of emitted light.

According to a fifty-second aspect of the present invention, in the forty-ninth aspect, extracting the propagating light provides the steps of, generating a potential difference at a designated region of an optical material layer, whose refractive index is changed corresponding to an external electric field of the waveguide array in which light is propagating, and changing the refractive index of the optical material layer by generating the potential difference.

According to a fifty-third aspect of the present invention, in the forty-ninth aspect, extracting the propagating light further provides the step of, correcting light extracting efficiency at the time when the light is extracted corresponding to a loss of the light in the waveguide array.

According to a fifty-fourth aspect of the present invention, in the forty-ninth aspect, the displaying method further provides reflecting light that was propagated in the waveguide array at the other end of the displaying region.

According to a fifty-fifth aspect of the present invention, in the forty-ninth aspect, the emitting light provides the steps of, storing an inputted analog image signal in capacitors, every pixel composing one line of the inputted analog image signal, applying the analog image signal to gate electrodes of TFTs at the same time, when the one line of the analog image signal was stored in the capacitors, and making organic EL layers of the one line connecting to source-drain electrodes of the TFTs emit light at the same time.

According to a fifty-sixth aspect of the present invention, in the forty-ninth aspect, at the emitting light, three colors of R, G, and B are emitted.

According to a fifty-seventh aspect of the present invention, in the forty-ninth aspect, at the emitting light, light is emitted based on a corrected image signal corresponding to a loss of the light in the waveguide array.

According to a fifty-eighth aspect of the present invention, there is provided a displaying method. The displaying method provides the steps of, emitting light of one line of a displaying image by plural light emitting elements, propagating the emitted light from one end to the other end of a waveguide array, leaking a part of the propagating light at a gray level controlling region, and extracting light controlled at the gray level controlling region from an arbitrarily one line crossing to the propagating direction of one line of the light.

According to a fifty-ninth aspect of the present invention, in the fifth-eighth aspect, the displaying method further provides the step of, absorbing light leaked at the gray level controlling region.

According to a sixtieth aspect of the present invention, in the fifty-eighth aspect, the leaking light and the extracting light provides the steps of, generating a potential difference at a designated region of an optical material layer, whose refractive index is changed corresponding to an external electric field of the waveguide array in which light is propagating, and changing the refractive index of the optical material layer by generating the potential difference.

According to a sixty-first aspect of the present invention, in the fifty-eighth aspect, the leaking light and the extracting light provides the step of, generating a potential difference at a region of an area based on an inputted digital image signal.

According to a sixty-second aspect of the present invention, in the fifty-eighth aspect, the extracting light further provides the step of, correcting light extracting efficiency at the time when the light is extracted corresponding to a loss of the light in the waveguide array.

According to a sixty-third aspect of the present invention, in the fifty-eighth aspect, the emitting light provides the steps of, driving switching elements provided corresponding to pixels composing one line of emitting light from one end of the one line in order, and making organic EL layers connecting to one end of the switching elements emit light from the one end in order.

According to a sixty-fourth aspect of the present invention, in the fifty-eighth aspect, at the emitting light, three colors of R, G, and B are emitted.

According to a sixty-fifth aspect of the present invention, in the fifty-eighth aspect, at the emitting light, light is emitted based on a corrected image signal corresponding to a loss of the light in the waveguide array.

According to a sixty-sixth aspect of the present invention, in the fifty-eighth aspect, the displaying method further provides the step of, reflecting light that was propagated in the waveguide array at the other end of the displaying region.

According to a sixty-seventh aspect of the present invention, there is provided a manufacturing method of a displaying device. The manufacturing method of the displaying device provides the steps of, forming a light emitting section that emits light of one line of a displaying image by plural light emitting elements, forming a waveguide array that propagates light emitted from the light emitting section from one end to the other end of a displaying region, and forming a light extracting section that extracts the propagating light from an arbitrarily selected region.

According to a sixty-eighth aspect of the present invention, in the sixty-seventh aspect, the forming the waveguide array provides the step of, forming a photosensitive acrylic resin having a polymer property on all surface of a supporting substrate made of a material having a polymer property by a spin coating method.

According to a sixty-ninth aspect of the present invention, in the sixty-seventh aspect, the forming the waveguide array further provides the steps of, forming high refractive index regions by exposing and etching the photosensitive acrylic resin coated on the supporting substrate, forming low refractive index regions by coating a low refractive index material having a polymer prosperity on the supporting substrate on which the high refractive index regions were formed by the spin coating method, and exposing the upper surfaces of the high refractive index regions by polishing the coated surface.

According to a seventieth aspect of the present invention, in the sixty-seventh aspect, the forming the light extracting section provides the steps of, forming a light scattering layer by a light scattering material having a polymer prosperity on a transparent substrate having a plastic prosperity, coating a transparent electrode material on all surface of the transparent substrate on which the light scattering layer was formed by a spattering method, forming plural electrodes by exposing and etching the transparent substrate on which the transparent electrode material was coated, coating polyimide on all surface of the supporting substrate on which the plural electrodes were formed by the spin coating method, forming an alignment layer by heating and rubbing the coated polyimide, and forming a liquid crystal layer on the supporting substrate on which the alignment layer was formed.

According to a seventy-first aspect of the present invention, in the sixty-seventh aspect, the forming the light extracting section provides the steps of, forming an optical material whose refractive index is changed corresponding to an external electric field on the waveguide array, and forming plural electrodes on the optical material.

According to a seventy-second aspect of the present invention, in the sixty-seventh aspect, the forming the light emitting section provides the steps of, forming TFT driving circuits for driving the light emitting elements on a transparent substrate having a glass property, and forming the light emitting elements on the transparent substrate on which the TFT driving circuits were formed.

According to a seventy-third aspect of the present invention, in the sixty-seventh aspect, the light emitting elements are organic EL elements.

According to a seventy-fourth aspect of the present invention, in the sixty-seventh aspect, the forming the light emitting section provides the steps of, forming TFT driving circuits for driving the light emitting elements on a transparent substrate having a glass property, forming a planalization layer for making the surface of the transparent substrate on which the TFT driving circuits were formed plane by using a transparent insulating material, forming transparent electrodes that connect the TFT driving circuits and the light emitting elements by opening contact holes at a part of the planarization layer, forming organic EL layers on the transparent electrodes, forming opaque electrodes on the organic EL layers, and forming a sealing layer for covering all of the transparent electrodes.

BRIEF DESCRIPTION OF THE DRAWINGS

The objects and features of the present invention will become more apparent from the consideration of the following detailed description taken in conjunction with the accompanying drawings in which:

FIG. 5 is a sectional view showing a waveguide array and a light extracting means at the Y-Z cross-section in FIG. 4;

FIG. 6 is a sectional view showing the waveguide array and the light extracting means at the X-Z cross-section in FIG. 4;

FIG. 17 is a perspective view showing a structure in which a waveguide array and a light extracting means are formed by a thin flexible material in another embodiment of the displaying device of the present invention;

FIG. 18 is a perspective view showing a structure in which a detecting means is provided at an entrance of a small container in which the waveguide array and the light extracting means are rolled up in another embodiment of the displaying device of the present invention; and FIG. 19 is a perspective view showing a structure in an embodiment used a different material of the displaying device of the present invention.

DESCRIPTION OF THE PREFERRED EMBODIMENTS

Figure 1:
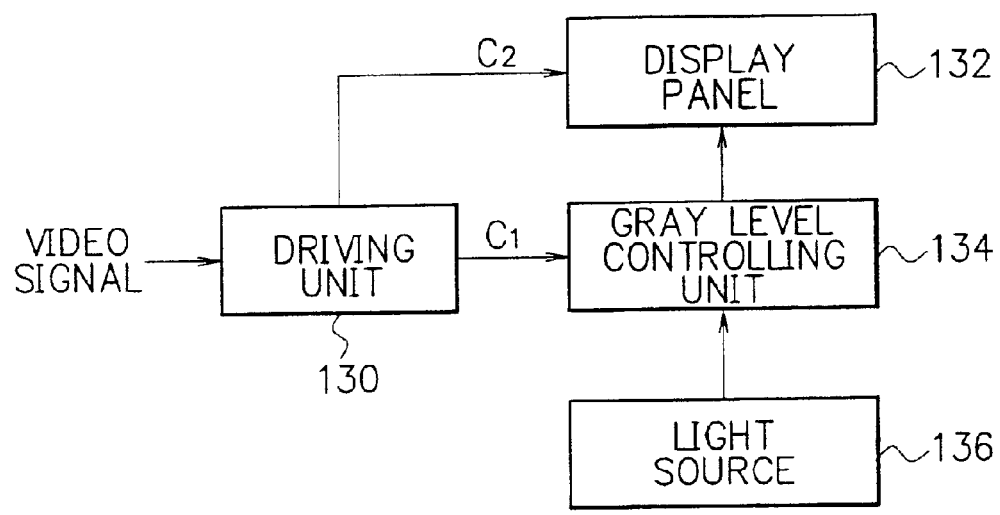
FIG. 1 is a block diagram showing the conventional flat panel display disclosed in Japanese Patent Application Laid-Open No. 2000-29398.
Figure 2:
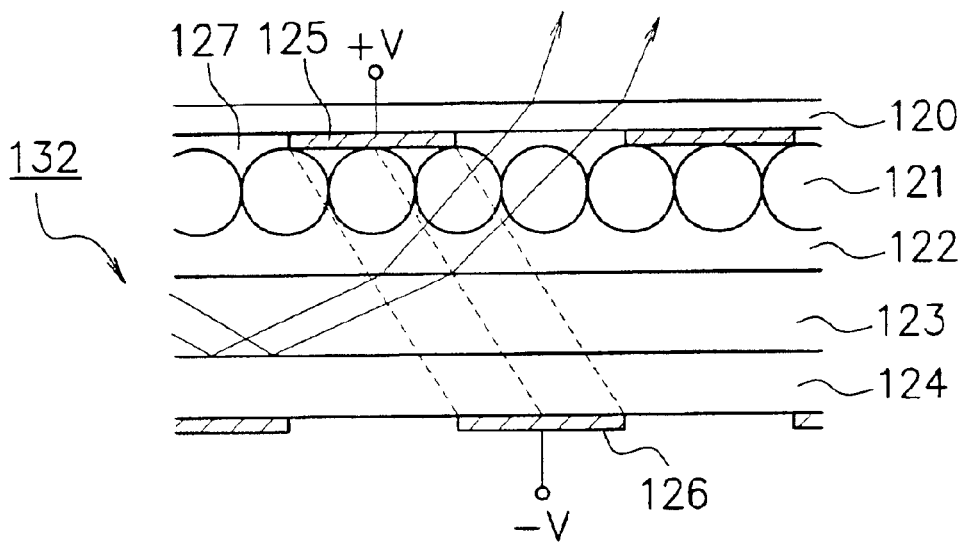
FIG. 2 is a sectional view showing a display panel shown in FIG. 1.
Figure 3:
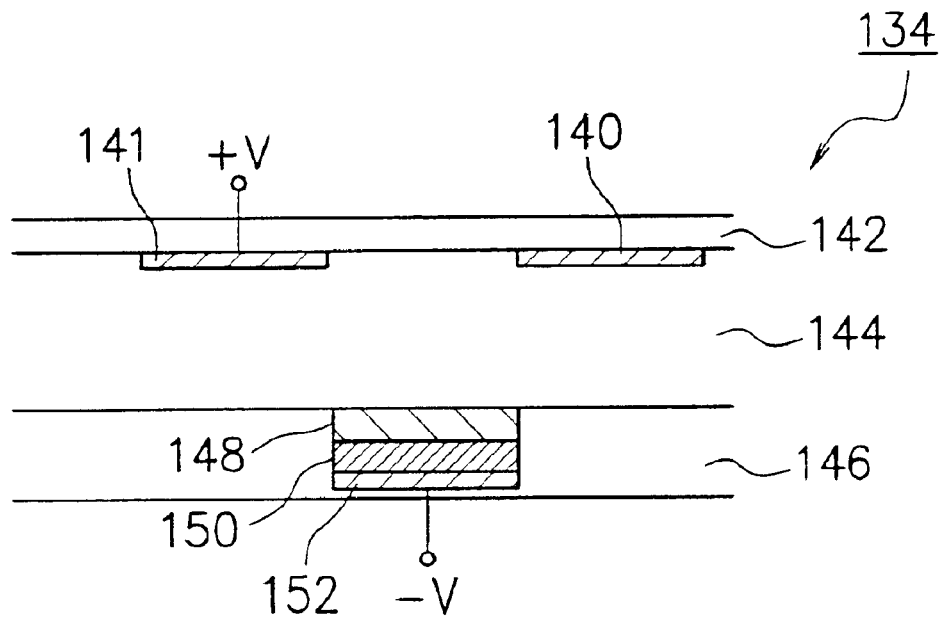
FIG. 3 is a sectional view showing a gray level controlling unit shown in FIG. 1.
Figure 4:
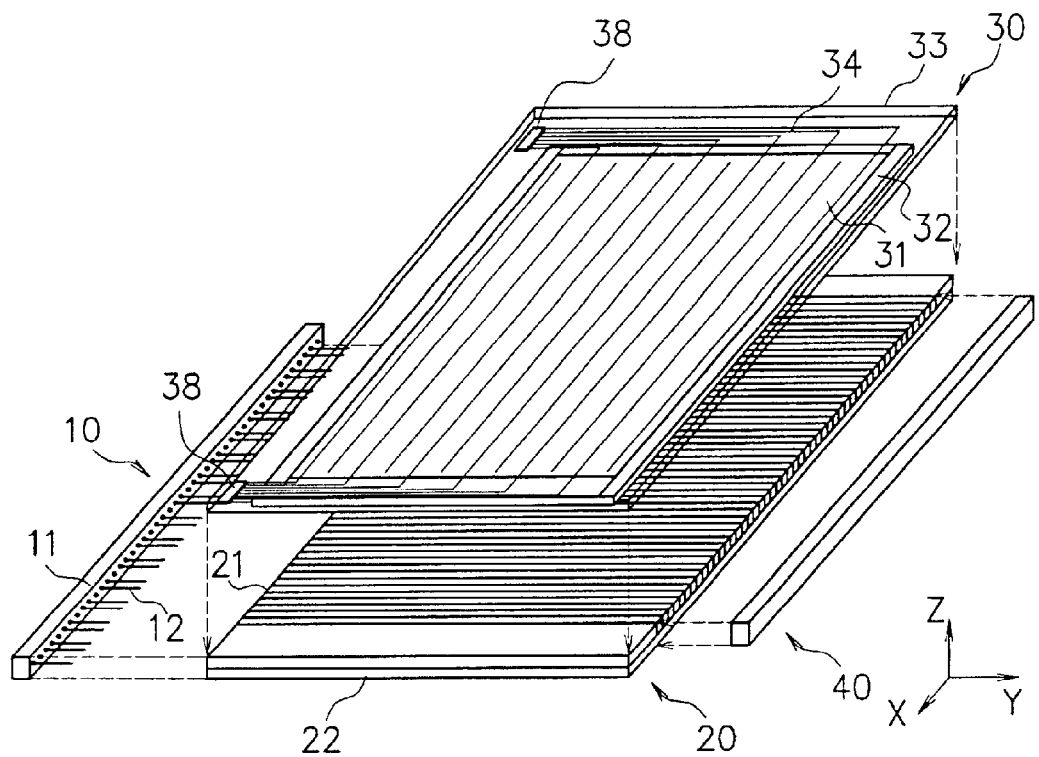
FIG. 4 is a perspective view showing main elements in a structure of a displaying device in a first embodiment of the present invention.

Referring now to the drawings, embodiments of the present invention are explained in detail. FIG. 4 is a perspective view showing main elements in a structure of a displaying device in a first embodiment of the present invention. As shown in FIG. 4, the displaying device provides a light emitting means (array) 10, a waveguide array 20, a light extracting means (section) 30, and a light reflecting means (section) 40.

The light emitting means 10 provides plural light emitting elements 11. The waveguide array 20 is composed of plural waveguides 21 arrayed on a supporting substrate 22. The light extracting means 30 consists of a transparent substrate 33 on whose surface plural electrodes 34 are formed, a liquid crystal sealing material 32, and a liquid crystal layer 31. And the liquid crystal layer 31 is sealed by the transparent substrate 33 and the liquid crystal sealing material 32.

The optical axis 12 of the light emitting element 11 is positioned so that light is inputted to the end part of the waveguide 21. In this, in case that the displaying device is a color displaying device, three primary colors red (R), green (G), and blue (B) are inputted to the waveguide 21 from the optical axis 12. And light reached the other end of the waveguide 21 is reflected by the light reflecting means 40. The electrodes 34 are formed on the surface, which contacts with the liquid crystal layer 31, of the transparent substrate 33. Two terminals 38 of the plural electrodes 34 are provided at the two edge parts of the transparent substrate 33 to connected to the outside. The plural electrodes 34 are disposed on the surface of the transparent substrate 33 alternately from the two terminals 38. And when a potential difference is given between the adjacent two electrodes 34, light is emitted from the region, between the two electrodes 34, of the liquid crystal layer 31.

Next, a structure, an operation, a manufacturing method, of the light emitting means 10, the waveguide array 20, and the light extracting means 30 being main elements of the displaying device in the first embodiment of the present invention are explained.

First, the structure of the waveguide array 20 and the light extracting means 30 is explained. FIG. 5 is a sectional view showing the waveguide array 20 and the light extracting means 30 at the Y-Z cross-section in FIG. 4. FIG. 6 is a sectional view showing the waveguide array 20 and the light extracting means 30 at the X-Z cross-section in FIG. 4. As shown in FIGS. 5 and 6, the waveguides 21 are formed by layering a light absorbing layer 23 and a waveguide clad 21b made of a low refractive index material in order on the supporting substrate 22. Further, a waveguide core 21a made of a high refractive index material, whose cross-section is rectangular or square, and a waveguide clad 21b, whose cross-section is rectangular or square, are disposed alternately on the layered waveguide clad 21b. The reason, why the light absorbing layer 23 is formed, is to prevent the contrast of a displayed image from deteriorating caused by which ambient light enters the waveguides 21 and the light leaks to the outside.

Next, in the light extracting means 30, the liquid crystal layer 31 is positioned between the waveguides 21 and the transparent substrate 33. A light scattering layer 36 is formed on the surface of the transparent substrate 33. The first and second electrodes 34a and 34b are formed on the surface of the light absorbing layer 36. An alignment layer 35 is formed on the light scattering layer 36 and the first and second electrodes 34a and 34b. The electric potential of the plural electrodes 34 can be independently controlled from the outside. The alignment layer 35 makes liquid crystal molecules align in a direction by force when the electric field is not given. On the surface not facing to the liquid crystal layer 31 of the transparent substrate 33, an antireflection layer 37 is formed. This antireflection layer 37 prevents the contrast of the displayed image from deteriorating caused by the light reflecting to the light extracting means 30. Light inputted to the antireflection layer 37 from the outside penetrates the antireflection layer 37 and is absorbed in the light absorbing layer 23.

The kinds and sizes of actual materials of the elements, which are provided in the waveguide array 20 and the light extracting means 30, and their manufacturing methods are explained. In this, in the color displaying device whose resolution is 200 ppi, the array pitch of the waveguide cores 21a of the waveguide 21 is set to be 32 μm corresponding to its pixel pitch. Also it is set that the cross-section area of the waveguide core 21a is about 6 times of that of the waveguide clad 21b.

Figure 7:
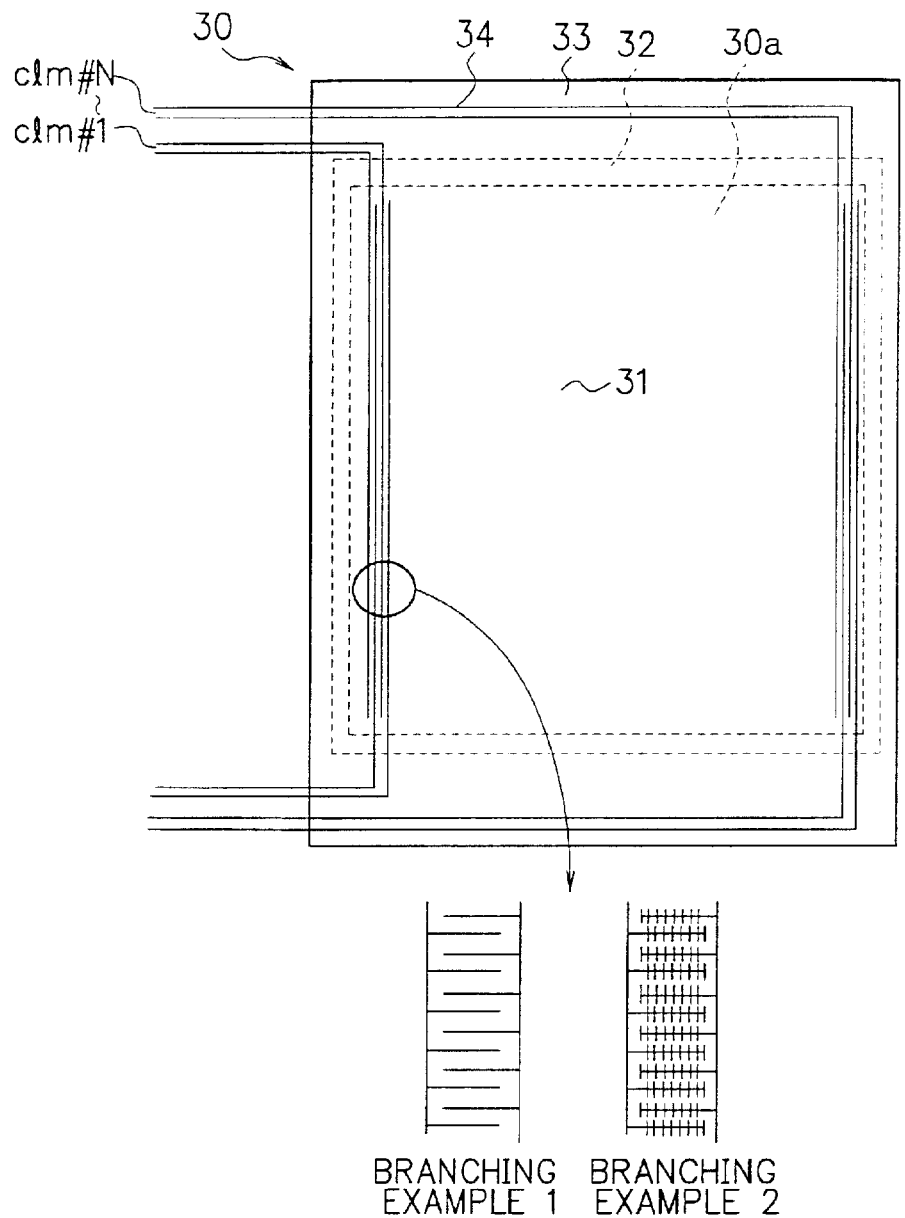
FIG. 7 is a plane view showing a structure of electrodes in the first embodiment of the displaying device of the present invention.

At the explanation mentioned above, as shown in FIG. 4, the electrodes 34 are explained as a pair of stripe-shaped electrodes. These electrodes 34 are explained in more detail. FIG. 7 is a plane view showing a structure of the electrodes 34 in the first embodiment of the displaying device of the present invention. As shown in a branching example 1 in FIG. 7, plural branches are formed from one piece of the electrodes 34, and the electrodes 34 is disposed so that the plural branches mesh with those of the other piece of the electrodes 34. In a branching example 2 in FIG. 7, further plural branches are formed from one piece of the plural branches of the electrodes 34, this structure can be also used. The reason, why the structure of the electrodes 34 is formed as mentioned above, is that the pixel pitch at a displaying region 30a is set to be 120 μm, and the pitch between a pair of the electrodes 34 is made to be 5 to 10 μm. By making the pitch between the electrodes 34 narrow, low power driving can be realized.

Next, the manufacturing method of the waveguide array 20 and the light extracting means 30 is explained. A manufacturing method of the waveguides 21 is explained. First, polymeric material such as a photosensitive acrylic resin is coated on the whole surface of the supporting substrate 22, formed by a polymeric material with 25 to 75 μm thickness, by such as a spin coating method. Second, the waveguide cores 21a arrayed with the 32 μm in pitch are formed by a photolithography method and an etching process, on a waveguide clad 21b.

The thickness of the waveguide cores 21a is set to be about 30 μm, however, the thickness of 10 to 20 μm is acceptable. There is a tendency that the thinner the thickness of the waveguide cores 21a is, the higher the light extracting efficiency is. When the waveguide cores 21a become thinner, the number of the total reflection at the boundary between the waveguide cores 21a and the waveguide clads 21b increases. Consequently, the probability, which extracted light reaches a designated region, becomes high.

Third, a low refractive index material being a polymeric material is coated on the whole surface by the spin coating method, and the waveguide clads 21b are formed. The surface is polished and the upper surface of the waveguide cores 21a is exposed. By the processes mentioned above, the waveguides 21 are manufactured by using a material, whose refractive index is about 1.7, for the waveguide cores 21a, and a material, whose refractive index is about 1.5, for the waveguide clads 21b.

As the transparent substrate 33, a plastic substrate made of such as an acrylic resin, a styrene resin, polycarbonate, or polyester sulfone can be used. As the light scattering layer 36, a polymeric material, which is used as an internal scattering material of a reflection type LCD, and as a light scattering material of a backlight, can be used. The electrodes 34 are formed, by forming a metal material such as aluminum (Al) and chromium (Cr) or a transparent electrode material like indium tin oxide (ITO) on the whole surface by a spattering method, and by patterning this formed surface by the photolithography method.

The alignment layer 35 is formed, by coating polyimide or poly amic acid being precursor of the polyimide on the whole surface by the spin coating method, and applying heat to this formed surface by such as a hot plate and further applying rubbing. As the liquid crystal layer 31, a twisted nematic (TN) material using generally for a TFT-LCD is used and a spacer technology using generally for an assembling process at the TFT-LCD is used, and the thickness of the liquid crystal layer 31 is made to be within a range 2 to 5 $\mu$m. Or if the displaying area of the liquid crystal layer 31 is small, by not using the spacer technology, the thickness of the liquid crystal layer 31 can be set to be within the same range of the liquid crystal sealing material 32. The values and the manufacturing methods of the elements in the waveguide array 20 and the light extracting means 30 are not limited to the values and the methods mentioned above.

Figure 8:
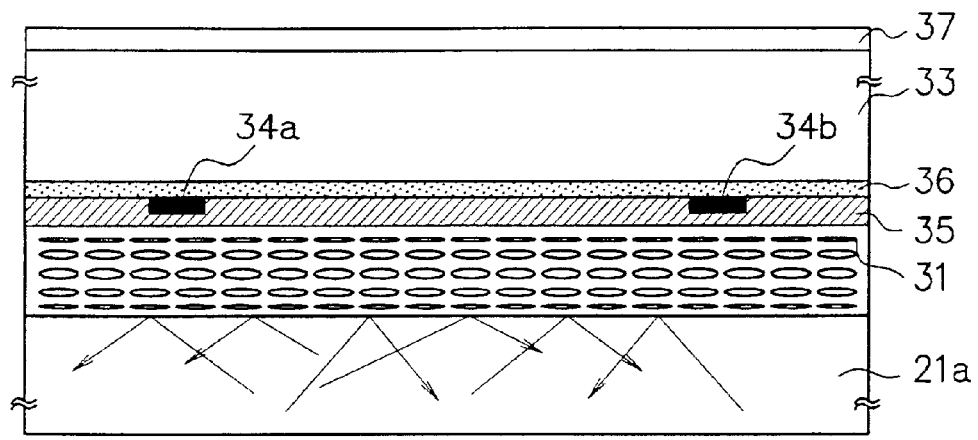
FIG. 8 is a sectional view showing a state in which liquid crystal molecules of a liquid crystal layer are aligned in the direction parallel to a transparent substrate in the first embodiment of the displaying device of the present invention.
Figure 9:
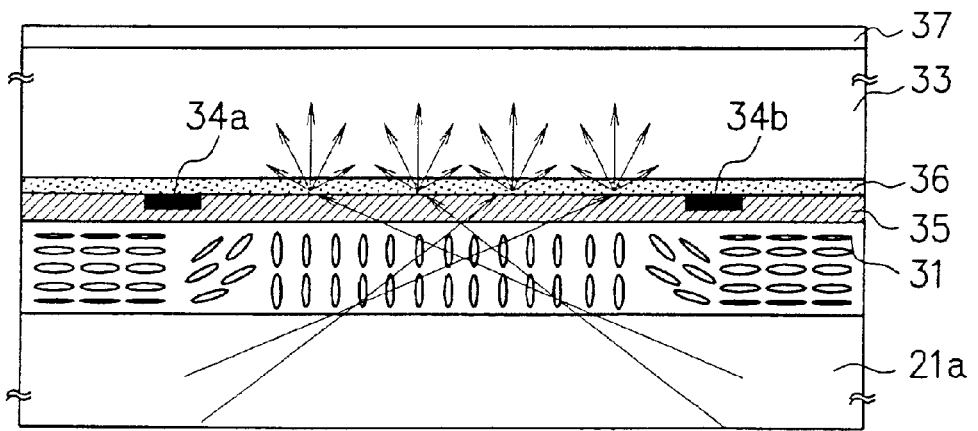
FIG. 9 is a sectional view showing a state in which the liquid crystal molecules of the liquid crystal layer are aligned in the direction perpendicular to the transparent substrate in the first embodiment of the displaying device of the present invention.

Next, the operation of the waveguide array 20 and the light extracting means 30 is explained. FIG. 8 is a sectional view showing a state in which liquid crystal molecules of the liquid crystal layer 31 are aligned in the direction parallel to the transparent substrate 33 in the first embodiment of the displaying device of the present invention. FIG. 9 is a sectional view showing a state in which the liquid crystal molecules of the liquid crystal layer 31 are aligned in the direction perpendicular to the transparent substrate 33 in the first embodiment of the displaying device of the present invention. Referring to FIGS. 4 to 9, the operation of the waveguide array 20 and the light extracting means 30 is explained.

Light emitted from each of the light emitting elements 11 in the light emitting means 10 is inputted to the waveguide 21 positioned facing to each of the light emitting elements 11. The inputted light is propagated in the waveguide core 21a of the waveguide 21 by repeating the total reflection at the boundary of the waveguide clad 21b and the liquid crystal layer 31.

As shown in FIG. 8, when a potential difference is not given between the first and second electrodes 34a and 34b, the liquid crystal molecules are aligned in the direction almost parallel to the transparent substrate 33. The refractive index of the liquid crystal layer 31 becomes about 1.5 for the light propagating in the waveguide core 21a. Consequently, the light is not leaked to the liquid crystal layer 31.

And as shown in FIG. 9, when a potential difference is given between the first and second electrodes 34a and 34b and an electric field is formed, the liquid crystal molecules are aligned in the perpendicular direction to the electric field. The refractive index of the liquid crystal layer 31 rises up to about 1.7. Consequently, the total reflection condition at the boundary of the waveguide core 21a and the liquid crystal layer 31 is broken. Therefore, the leaked light is inputted to the light scattering layer 36 at an acute angle by propagating through the liquid crystal layer 31. This light is scattered at the light scattering layer 36, and the scattered light is reaches an observer by propagating through the transparent substrate 33 and the antireflection layer 37. The reason, why the light scattering layer 36 is provided, is that the observer can recognize almost the same image even when the observer watches the displaying device from any direction.

Alternatively, a following structure is also possible by using a positive type nematic liquid crystal having positive dielectric anisotropy. In this structure, when a potential difference does not exist between the first and second electrodes 34a and 34b, the liquid crystal molecules are aligned perpendicular to the transparent substrate 33. And when the potential difference exists between the first and second electrodes 34a and 34b, the liquid crystal molecules are aligned parallel to the transparent substrate 33. This structural difference depends on the material using for the liquid crystal layer 31.

Further, a following structure is also possible. In this structure, when a potential difference does not exist between the first and second electrodes 34a and 34b, the alignment of the liquid crystal molecules is made to be a light leaking state. And when the potential difference exists between the first and second electrodes 34a and 34b, the alignment of the liquid crystal molecules is made to be a light not leaking state. However, the displaying device in the first embodiment of the present invention is different from a general liquid crystal displaying device, which turns on its backlight at all the time, and can display an image on a part of the displaying region. Therefore, it is not necessary that the light is extracted from all the displaying region at all the time in the present invention. Consequently, the structure, in which a potential difference is given only to a region where the light is extracted, can be worked in low power consumption.

In the explanation mentioned above, the alignment states of the liquid crystal molecules shown in FIGS. 8 and 9 are examples. And actually, various kinds of alignment states can be realized by applying the rubbing process to the alignment layer 35 and selecting the dielectric anisotropy of the liquid crystal. In the present invention, its important concept is that the refractive index at the time when the light is inputted to the liquid crystal layer 31 is changed by controlling the alignment state of the liquid crystal molecules from the outside by whether the electric field exists or not. Whether the light is leaked from the waveguides 21 or not is controlled from the outside by a voltage applying means. This is important in the present invention.

Figure 10:
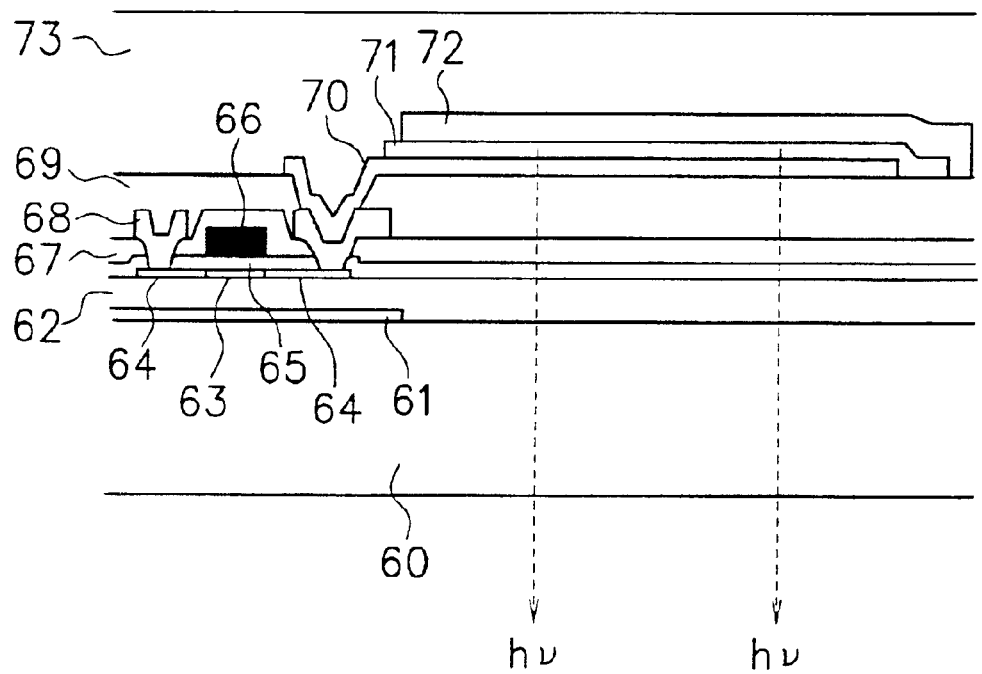
FIG. 10 is a sectional view showing a structure of a light emitting means in the first embodiment of the displaying device of the present invention.

Next, the structure of the light emitting means 10 is explained. FIG. 10 is a sectional view showing a structure of the light emitting means 10 in the first embodiment of the displaying device of the present invention. In FIG. 10, main elements of which the light emitting means 10 is composed and their positions are shown. The light emitting means 10 is composed of the light emitting elements 11, which are formed on a transparent substrate 60 by a series of thin film manufacturing processes, and a circuit to drive them. These processes are explained later in detail.

The light emitting element 11 is a two terminal element (diode) in which an organic electro-luminescence (EL) layer 71 is positioned between a transparent electrode 70 and an opaque electrode 72. In order to prevent the light emitting element 11 from deteriorating caused by outside water components, a sealing layer 73 is provided at the outside of the opaque electrode 72. A part of the transparent electrode 70 is connected to a source-drain electrode 68 of a TFT by wiring (not shown), and the opaque electrode 72 is connected to the outside by wiring (not shown).

Next, referring to FIG. 10, manufacturing processes of the light emitting means 10 is explained. The manufacturing processes are divided into a first manufacturing process and a second manufacturing process. In the first manufacturing process, TFTs are formed, and in the second manufacturing process, the light emitting elements 11 are formed by using an organic EL material.

In the first manufacturing process, various kinds of TFTs can be adopted. In the first embodiment of the present invention, as an example, a top gate type polycrystalline silicon (poly-Si) TFT is used.

First, a high melting point material such as tungusten-silicide (WSi) is formed on a transparent substrate 60 made of such as glass by a spattering method. A light shielding layer 61 is formed by patterning by using such as a photolithography method. In case that the light shielding layer 61 is formed by the WSi, it is enough that its thickness is 100 to 200 nm.

Second, a barrier layer 62 made of $SiO_2$ is formed on the surface of the light shielding layer 61 and the transparent substrate 60 by a chemical vapor deposition (CVD) method that makes $SiO_2$ deposit, by decomposing oxygen (O) and gas such as silane ($SiH_4$) including Si in plasma. This barrier layer 62 prevents impurity elements including in the transparent substrate 60 from diffusing into upper layers of the barrier layer 62, during the following processes. This thickness is set to be 300 to 500 nm.

Third, an amorphous Si (a-Si) layer being a precursor layer of a poly-Si layer is formed by a method either a plasma CVD method, a reduced pressure CVD method, or the spattering method. The thickness of the a-Si layer is set to be about 100 nm. The a-Si layer is reformed to a poly-Si layer by melting the a-Si layer instantly, by irradiating very short pulse light being several 10 nsec. from an excimer lazer. At this time, if the irradiation energy density is about 400 mJ/cm$^2$, it is known that a poly-Si TFT having good characteristics can be obtained.

A patterning is applied to this poly-Si layer by the photolithography method, and a $SiO_2$ film with about 50 nm thickness and a WSi layer with about 200 nm thickness are formed. Also, a patterning is applied to the WSi layer by the photolithography method and a gate insulating layer 65 and a gate electrode 66 are formed.

Next, high concentration phosphorus (P) or boron (B) is selectively doped in a source-drain region of TFT 64 by an ion doping method. The transparent substrate 60 is heated to about 500° C., and the doped impurity element is activated. At this time, process conditions such as the concentration of the impurity element, heating time, and temperature are important. These process conditions are decided so that an ohmic contact can be obtained between a bonding material and the source-drain region of TFT 64.

In the processes mentioned above, the source-drain region of TFT 64 is formed. The region where the impurity element was not doped becomes a channel region of TFT 63. An insulating layer 67 made of $SiO_2$ is formed by the plasma CVD method, and a contact hole is opened. A source-drain electrode 68 and wiring are formed by using a low resistance metal material. By these processes mentioned above, the TFT manufacturing processes are completed.

Next, the second manufacturing process being a manufacturing process of the light emitting elements 11 is explained.

First, a planarization layer 69, which makes a surface plane, is formed on the insulating layer 67 and the source-drain electrode 68 by using a transparent insulation material like an acrylic resin. A contact hole is opened at a part of the planerization layer 69, and a layer is formed on the surface of the planerization layer 69 by using a material like ITO by the spattering method. This layer becomes an anode of the light emitting element 11. A transparent electrode 70 is formed by patterning this layer by the photolithography method. In case that the ITO is used as the anode material, the transparent electrode 70 is formed with about 20 sheet resistance/□ and about 100 nm thickness.

Second, as shown in FIG. 10, an organic EL layer 71 is formed on the transparent electrode 70. As the organic EL layer 71, several structures such as a two layered structure made of a light emitting layer and a hole injection and transportation layer, a three layered structure added an electron injection and transportation layer to the two layered structure, and a four layered structure further disposed a thin insulating layer on the boundary with a metal electrode, are known. Either of the structures mentioned above can be used for the organic EL layer 71 shown in FIG. 10. Only the organic EL layer 71 is shown in FIG. 10, however, the structures mentioned above can be used in the present invention.

As the manufacturing method of the organic EL layer 71, the spin coating method, a vacuum deposition method, and an inkjet printing method are known. Corresponding to each of the manufacturing methods, manufacturing conditions such as selecting an organic EL material from a polymeric material or a low-molecular material, deciding the structure of its base, deciding a manufacturing method for an upper electrode, are determined. In the present invention, as a material for the hole injection and transportation layer of the organic EL layer 71, for example, triarylamine derivatives, oxadiazole derivatives, or porphylin derivatives can be used. As a material for the light emitting layer, for example, 8-hydroxyquinoline derivatives, a metal complex of the derivatives, or tetraphenylbutadiene derivatives, or distyrylaryl derivatives can be used. The hole injection and transportation layer and the light emitting layer are formed by the vacuum deposition method and layered with about 50 nm thickness each.

In FIG. 10, the organic EL layer 71 is patterned as it covers almost the whole surface of the transparent electrode 70. However, since the organic EL layer 71 is an insulating layer, it is not necessary that it is patterned, and it is acceptable that the organic EL layer 71 covers the whole surface of the transparent electrode 70. However, in case that the organic EL layer 71 is used for a color display, at least three color light emissions and their separation are required, therefore the organic EL layer 71 must be patterned.

Third, as a cathode of the light emitting element 11, an opaque electrode 72 is formed, by forming a material like an aluminum-lithium alloy with about 200 nm thickness on the organic EL layer 71 through a metal shadow mask by the vacuum deposition method. Last, in order to protect the organic EL layer 71 from oxygen and humidity, a sealing layer 73, which is made of $SiO_2$, SiNx, or SiON, is formed on the whole surface. Or the whole elements are covered with a glass or metal cover, and air is replaced by inert gas such as nitrogen and argon, this can act as the sealing layer 73.

Figure 11:
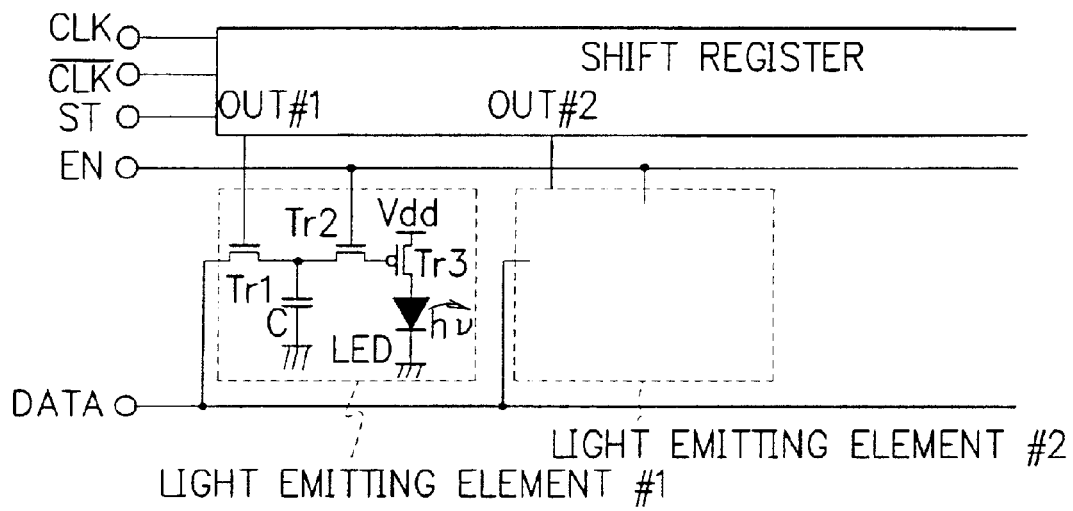
FIG. 11 is a circuit diagram of the light emitting means in the first embodiment of the displaying device of the present invention.
Figure 12:
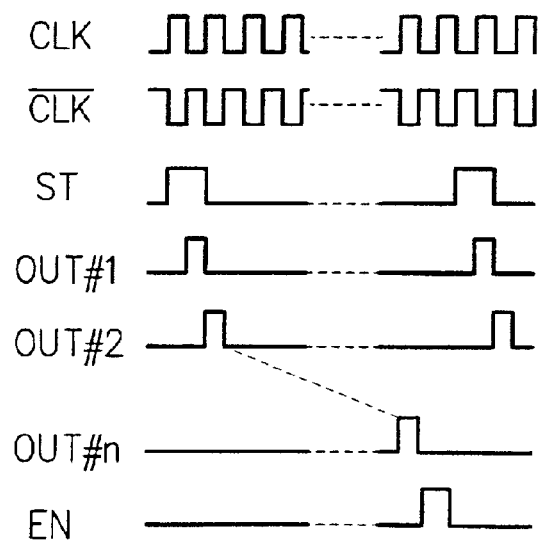
FIG. 12 is a timing chart in the light emitting means in the first embodiment of the displaying device of the present invention.

FIG. 11 is a circuit diagram of the light emitting means 10 in the first embodiment of the displaying device of the present invention. FIG. 12 is a timing chart in the light emitting means 10 in the first embodiment of the displaying device of the present invention. In FIG. 11, the light emitting element 11 is described as an LED, and a TFT, which is connected to one end of the LED and supplies a current to the LED, is described as Tr3. A capacitor C, a Tr1 (TFT), and a Tr2 (TFT) are connected as shown in FIG. 11. The capacitor C keeps the gate of the Tr3 in a constant electric potential. The Tr1 charges the C until a desiring voltage corresponding to a video signal. The Tr2 works as a switch transferring the electric potential of the C to the gate of the Tr3. The drain electrode of the Tr3 is connected to the power supply Vdd.

Hereinafter, in FIG. 11, a part surrounded by the doted line is called as a light emitting element. As shown in FIG. 11, plural light emitting elements are arrayed in one dimensionally in the light emitting means 10. A TFT circuit (shift register circuit) is provided to drive these plural light emitting elements. This TFT circuit (shift register circuit) is composed of poly-Si TFTs, and it is desirable that the circuit is composed of a CMOS circuit using both n type TFTs and p type TFTs.

Next, referring to FIGS. 10 to 12, the operation of the light emitting means 10 in the first embodiment of the displaying device of the present invention is explained. First, as shown in FIG. 11, a clock signal CLK being a pulse sequence and a start signal ST are supplied to the shift register circuit, and each of the Tr1s of plural light emitting elements is driven in order from the beginning Tr1. When video signals to be displayed are given as DATA, synchronizing with these ST and CLK, the video signals are written in respective capacitors C.

After the video signal were written in all of the light emitting elements, all Tr2s of the light emitting elements are driven at the same time by giving an enabling signal EN. A desired voltage corresponding to each of the video signals is applied to each of gate electrodes of the Tr3s. When the voltage is applied to each of the gate electrodes, a current corresponding to this voltage is supplied to each of the LEDs from the Vdd. As shown in FIG. 10, light is emitted from the organic EL layer 71 in the direction of the transparent substrate 60. A part of the emitted light is penetrated through the transparent substrate 60 and is watched by an observer (not shown).

Referring to the timing chart shown in FIG. 12, this operation is explained. The operation timing of the shift register circuit is given by the CLK and CLK bar signifying the inverted value of the CLK. First, when the ST becomes a high level, an OUT #1 becomes high, and the Tr1 of the light emitting element #1 is driven, and a video signal is written in the capacitor C in the light emitting element #1. At the next clock timing, an OUT #2 becomes high, and the Tr1 of the light emitting element #2 is driven, and a video signal is written in the capacitor C in the light emitting element #2. Like these, the same operation is executed to an OUT #n in order.

One line of an image signal (video signal) is composed of signals from the OUT #1 (light emitting element #1) to the OUT #n (light emitting element #n). Therefore, when the operation is completed until the OUT #n, one line of the image signal has been stored in the capacitors C of all of the light emitting elements. At this time, all of the Tr2s of the light emitting elements are driven at the same time by making the EN a high level. The voltage storing in each of the capacitors C is applied to each of the gate electrodes of the Tr3s of the light emitting elements. With this operation, one line of the image signal is processed.

And at the next clock timing, the ST becomes the high level again, and the same operation mentioned above is executed and the next line is processed. Therefore, a light emission having an arbitrary light intensity pattern can be executed by using the structure mentioned in FIGS. 10 and 11. Even when the Tr2 is not driven, the Tr3 continues to supply a current to the LED. Therefore, while the video signal is being written in the capacitors C, a current corresponding to the video signal which was written at the previous time is flowing in each of the LEDs. Consequently, the amount of light of all of the light emitting elements can be changed at the same time by giving the EN signal.

Next, referring to the drawings, a total operation in the first embodiment of the displaying device of the present invention is explained. First, a video signal corresponding to a first line of an image to be displayed is written in the capacitors C in each of the light emitting elements of the light emitting means 10. Next, when an EN signal shown in FIG. 12 is given, light having a light intensity pattern corresponding to the first line of the displaying region 30a shown in FIG. 7 is emitted from the light emitting means 10. The emitted light is inputted to the waveguide core 21a of the waveguide 21 corresponding to each of the light emitting elements and is propagated in the waveguide core 21a.

At the same time, a control signal is given to the first and second electrodes 34a and 34b corresponding to the position of the first line of the displaying region, and the alignment of the liquid crystal layer 31 corresponding to the displaying region is changed. Consequently, the light emitted from the light emitting means 10 is extracted from only the first line of the displaying region. An arbitrary image can be displayed by repeating this operation for all lines. At any instant during this displaying operation, the light is extracted from only one line of the displaying region. However, the extracted image can be watched by an observer as a normal two-dimensional image by the afterimage phenomenon of human eyes, as the same as in displays such as a CRT, and a laser display.

In the first embodiment of the present invention, there is a case that the light in the waveguides 21 is attenuated to a level, which cannot be ignored, depending on its designing and manufacturing methods. As the result, the farther the line is from the light emitting means 10, the darker the displayed image becomes. For example, when white is displayed on the whole region, there is a case that a gradual gray level difference can be watched visually.

The light attenuation inside the waveguides 21 is caused by an abnormal shape of the boundary between the waveguide cores 21a and the waveguide clads 21b, and the characteristics of the material of the waveguides 21 themselves. Therefore, this attenuation can be decreased by improving the manufacturing method and selecting a suitable material. Since the attenuation amount of the light can be accurately measured in each of the waveguides 21, this problem can be solved by correcting video signals beforehand based on the measured result. The video signals inputted to the displaying device are inputted to a video correcting circuit having parameters based on this measured result. This correction can be also executed by correcting the extracting efficiency in the light extracting means 30. For example, there are methods such as correcting the array pitch between the electrodes 34, and correcting the voltage value applying to the electrodes 34. In case that the correction of the array pitch is executed, the array pitch between the electrodes 34 in lines far from the light emitting means 10 is made to be large corresponding to the amount of the attenuation in the waveguides 21 beforehand. Consequently, the light is extracted from this enlarged array pitch region.

Figure 13:
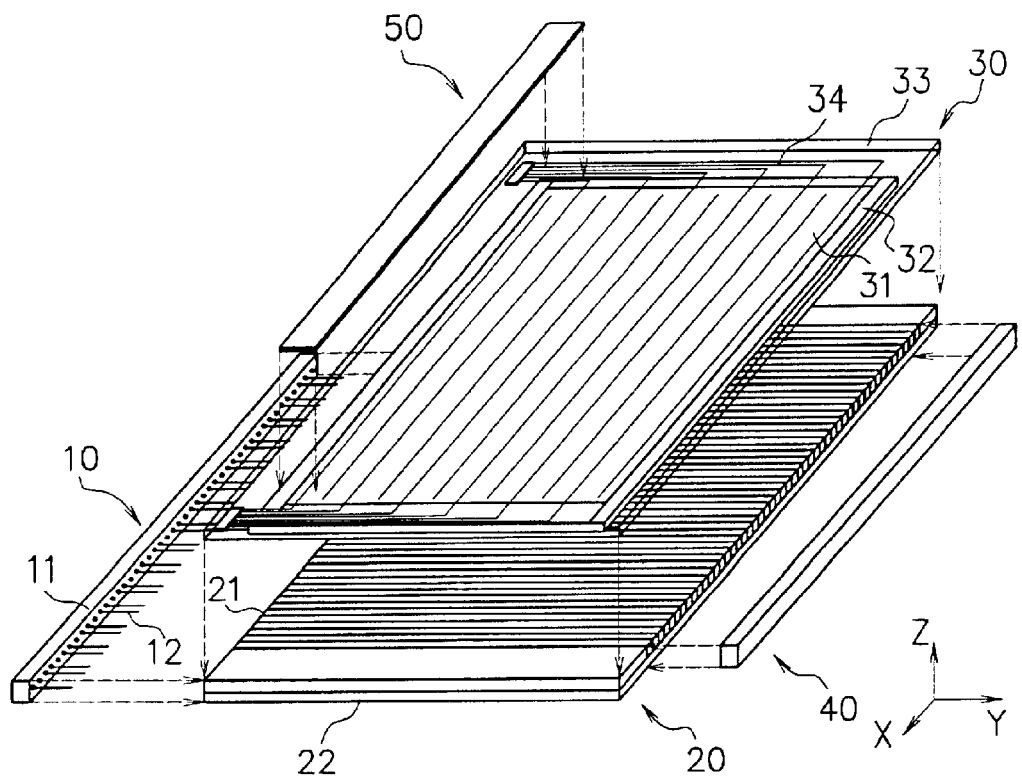
FIG. 13 is a perspective view showing main elements in a structure in a second embodiment of the displaying device of the present invention.
Figure 14:
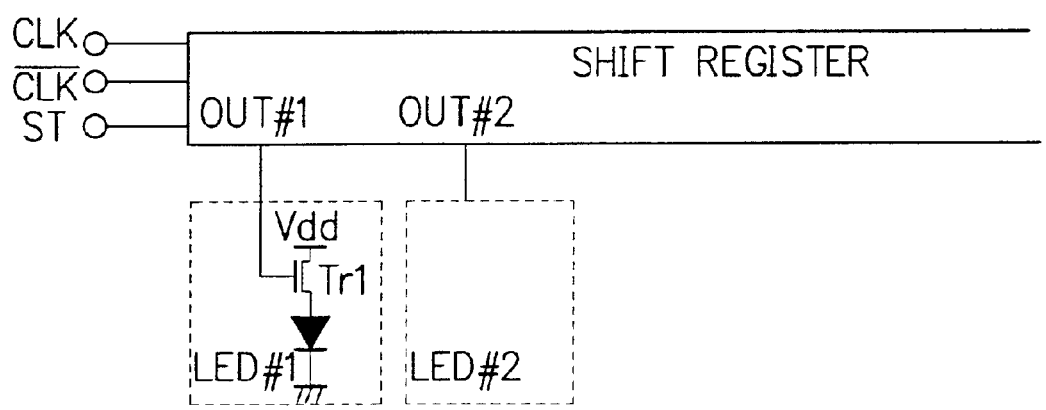
FIG. 14 is a circuit diagram of a light emitting means in the second embodiment of the displaying device of the present invention.
Figure 15:
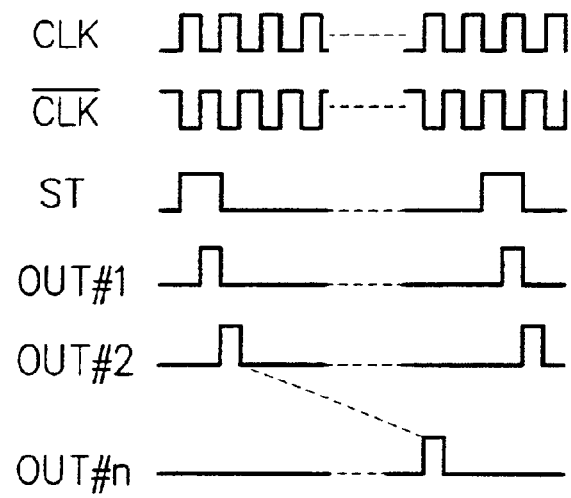
FIG. 15 is a timing chart in the light emitting means in the second embodiment of the displaying device of the present invention.
Figure 16:
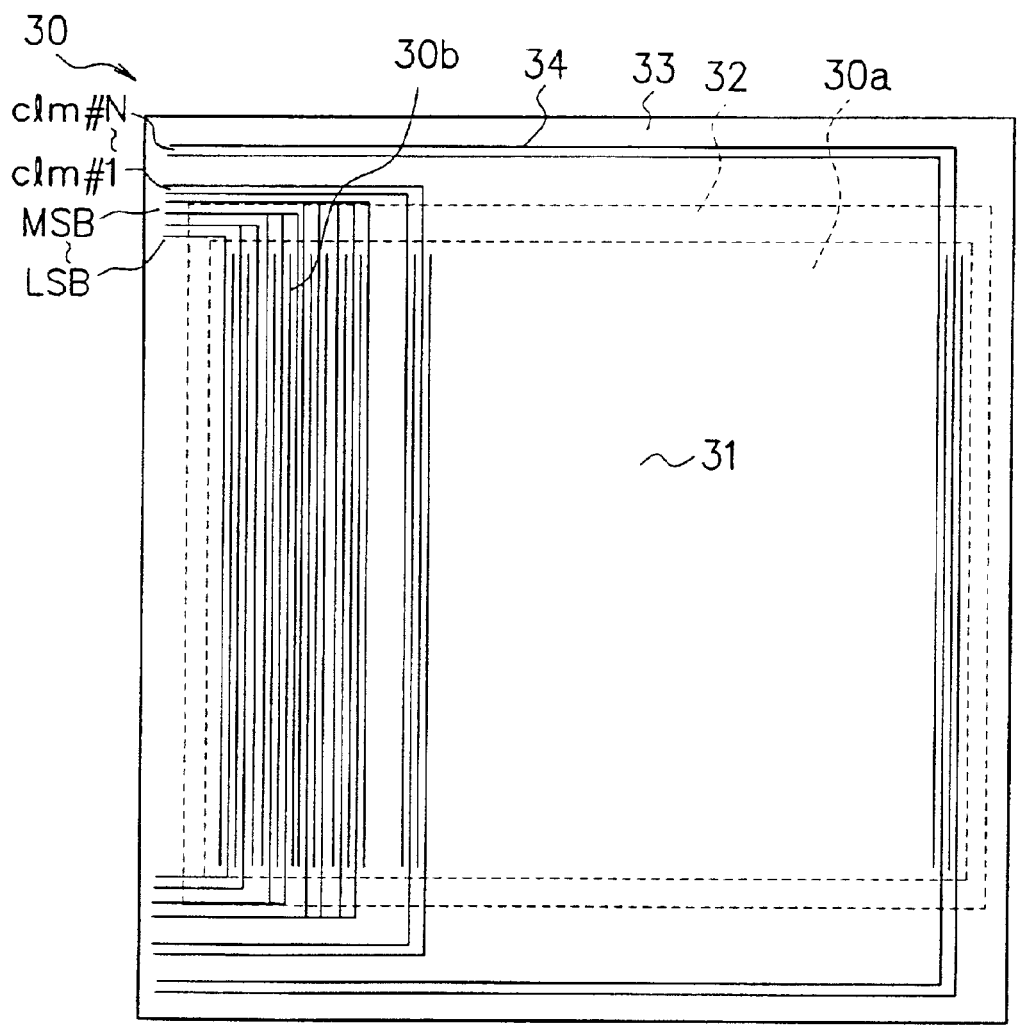
FIG. 16 is a plane view showing a light extracting means in the second embodiment of the displaying device of the present invention.

Next, referring to drawings, a second embodiment of the displaying device of the present invention is explained. FIG. 13 is a perspective view showing main elements in the structure in the second embodiment of the displaying device of the present invention. FIG. 14 is a circuit diagram of a light emitting means 10 in the second embodiment of the displaying device of the present invention. FIG. 15 is a timing chart in the light emitting means 10 in the second embodiment of the displaying device of the present invention. FIG. 16 is a plane view showing a light extracting means 30 in the second embodiment of the displaying device of the present invention. In the second embodiment, each element, which has almost the same function as that in the first embodiment, has the same reference number. In the second embodiment, compared with the first embodiment, a light absorbing means (section) 50 is newly added, and the structures of the light extracting means 30 and the light emitting means 10 are different from those in the first embodiment.

In FIG. 16, the region where light is extracted from the waveguide array 20 is a region where the liquid crystal layer 31 and the electrodes 34 are overlapped. The overlapped region is divided into a displaying region 30a and a gray level controlling region 30b. The displaying region 30a displays an image, and the gray level controlling region 30b has a function to attenuate the amount of light corresponding to a video signal and does not display the image. In FIG. 13, the light absorbing means 50 is positioned to cover the gray level controlling region 30b shown in FIG. 16, in order that the light absorbing means 50 absorbs the light leaked from the gray level controlling region 30b.

In FIG. 14, each of the light emitting elements is composed of an LED made of an organic EL material and a Tr1 being such as a poly-Si TFT. Each of these light emitting elements is driven by a shift register circuit composed of such as the poly-Si TFTs. A power supply Vdd is connected to the drain electrode of the Tr1. The Tr1 of each light emitting elements is either in a conductive state or a non-conductive state. As shown in the timing chart of FIG. 15, only when an OUT #n is outputted from the shift register circuit, light is emitted from the LEDn of the light emitting element #n by flowing a current through the LEDn. The amount of the emitted light is either 1 or 0 level at this time.

Next, referring to the timing chart shown in FIG. 15, the operation mentioned above is explained in detail. The operation timing of the shift register circuit is given by the CLK and CLK bar signifying the inverted value of the CLK. First, when the ST becomes a high level, an OUT #1 becomes high, and the Tr1 of the light emitting element #1 is driven, and light is emitted from the LED #1. At the next clock timing, an OUT #2 becomes high, and the Tr1 of the light emitting element #2 is driven, and light is emitted from the LED #2. Like these, the same operation is executed to the OUT #n in order.

One line of an image signal (video signal) is composed of signals from the OUT #1 (LED #1) to the OUT #n (LED #n). When the operation is completed until the OUT #n, the light of one line is emitted. Next, the ST becomes high again, the operation for the next line is executed. In this operation, the light is only digitally emitted form the LEDs at a designated timing, and the amount of light is not controlled. This is different from the first embodiment in which the amount of light is controlled at this time. Further, in the second embodiment, light is inputted to the waveguides 21 repeatedly in one pixel unit, not in one line unit. Therefore, in the second embodiment, compared with the first embodiment, the circuit structure of the light emitting means 10 can be simplified.

Video signals are inputted to the electrodes 34 as signals a most significant bit (MSB), an MSB-1, . . . , a least significant bit (LSB), not to the light emitting means 10 in the first embodiment. And the area of the liquid crystal layer 31 positioned under the electrodes 34, to which the video signals are inputted, is set to be 1/the nth power of 2, corresponding to that the video signals become from the MSB to the LSB. For example, the area of the liquid crystal layer 31 where the MSB-1 is inputted is ½ of the area of the liquid crystal layer 31 where the MSB is inputted. In case of the MSB-2, the area becomes ¼ of the area for the MSB.

The reason, why the area is set to be 1/the nth power of 2, is that inputting data are digital data. For example, a video signal is composed of 8 bit data, 16 lines of the electrodes 34 are provided and 8 kinds of areas are provided.

Referring to FIGS. 13 to 16, the operation in the second embodiment of the displaying device of the present invention is explained. First, a line, in which an image is desired to display, is selected by giving a video signal to the electrodes 34 in the displaying region 30a. Next, the shift register circuit in the light emitting means 10 is driven, and each of the LEDs is turned on in order from the beginning. It is set that two or more LEDs are not turned on at the same time. The video signal is applied to the electrodes 34 in the gray level controlling region 30b as digital signal of 1 or 0, by synchronizing with the turning on of the LEDs. With this, by the same theory mentioned in the first embodiment, light is extracted from the waveguides 21 by the light extracting means 30, and the extracted light is absorbed by the light absorbing means 50.

The electrodes 34 in the gray level controlling region 30b can change the alignment of the liquid crystal layer 31 by the area corresponding to the digital data. Therefore, a designated amount of light can be made to leak to the outside, and the amount of light propagating inside the waveguides 21 can be controlled. The reason, why the light absorbing means 60 is provided, is to prevent the contrast of the image from deteriorating caused by the light leaked from the gray level controlling region 30b.

As mentioned above, the light, whose amount was controlled, is led to a line of the displaying region 30a, and the light is extracted from the region in this line selected by the electrodes 34. This operation is repeated for all of the lines in the displaying region 30a, and an arbitrary image can be displayed. At any instant during the displaying operation, the light is extracted from only one pixel in the displaying region 30a. The extracted light can be watched by an observer as a normal two-dimensional image by the afterimage phenomenon of human eyes, as the same as at displays such as a CRT, and a laser display.

As mentioned above, in a case that video signals are digital data, the second embodiment of the present invention can be used effectively. Recently, communication systems have been switched to digital systems, and also their interfaces have been switched to digitally capble interfaces. At these cases, it is not necessary to convert analog signals to digital signals in the second embodiment, and further a high resolution image can be displayed.

Next, embodiments applied the first and/or second embodiments of the displaying device of the present invention are explained. Without departing from the concept of the present invention, several embodiments applied the first and/or second embodiments can be executed by replacing the elements and adding functions.

First, in order to realize a color display, as the light emitting means 10, a means that can output three primary colors R, G, and B is used. This three-color light emitting means can be realized by which a white-light emitting material is combined with color filters, a blue-color emitting material is combined with color conversion materials, or R, G, and B light emitting materials are positioned in parallel.

In the first and second embodiments of the present invention, the light emitting means 10 emits light of 1 line of the displaying region 30a. However, not limiting to the 1 line, an image can be displayed by designating the number of pixels. For example, when video signals are charged in the capacitors C of the light emitting elements of a half line, an EN signal is outputted, and light is emitted, this is also possible. Or light can be extracted from a specific region by controlling the voltage applying to the electrodes 34.

In the first embodiment shown in FIG. 5, in the waveguide 21, the waveguide core 21a, the liquid crystal layer 31, the alignment layer 35, and the first and second electrodes 34a and 34b are layered in this order. However, this positioning order is not limited to this order. For example, the first and second electrodes 34a and 34b can be positioned, contacting with the upper surface of the waveguide core 21a. Or the alignment layer 35 can be positioned, contacting with the upper surface of the waveguide core 21a.

And as shown in FIG. 10, in the structure of the light emitting element 11, the organic EL layer 71 is used and light is emitted in the direction of the transparent substrate 60. However, the light can be emitted in the opposite direction of the transparent substrate 60, by changing the positions of the transparent electrode 70 and the opaque electrode 72. In this case, the transparent substrate 60 does not need to be transparent.

Or an inorganic material can be used instead of an organic EL material for the LED. An LED, made of an inorganic material and its one side is about 20 to 300 $\mu$m, can be used as the LED shown in FIG. 11. For example, an LED, made by which an AlGaInP material is formed on an n type GaP substrate, can be sued. In case that this kind of LED made of the inorganic material is used, compared with the organic EL layer 71, the amount of light can be obtained abundantly. Therefore, the luminance of the displaying device becomes large and the brightness of the light emitting type display is increased, this is an advantage. However, a process, in which inorganic LEDs are bonded by arraying them regularly, is required, and its manufacturing cost becomes high.

On the other hand, in the structure forming the organic EL layer 71, many elements are formed at the same time at its layer forming process using the vacuum deposition method or the spin coating method. Therefore, in a case that the number of light emitting elements is large, the structure using an organic EL material has an advantage.

In FIG. 10, the case, in which the top gate type poly-Si TFT is used, was explained. However, a bottom gate type poly-Si TFT can be used in the light emitting elements shown in FIG. 11. Or either a staggered amorphous silicon (a-Si) TFT or an inverting staggered a-Si TFT instead of the poly-Si TFT can be used as the light emitting elements.

In case that the a-Si TFT is used, compared with the poly-Si TFT, the manufacturing process of the TFT is simplified, this is an advantage. However, it is difficult to realize the shift register circuit shown in FIG. 11 by using the a-Si TFTs, therefore, the shift register circuit must be made by a crystalline Si IC and connected to the substrate.

In FIG. 11, a structure, in which all of the Tr1, Tr2, and Tr3 are disposed outside the transparent substrate 60 and are connected to the LED, is also possible. In this case, the manufacturing process of the TFTs does not need and the manufacturing process of the light emitting element itself is simplified, and the manufacturing cost of this process is decreased. However, the number of terminals connecting to the outside becomes large, and the displaying device cannot be small sized.

The waveguide array 20 and the light extracting means 30 can be rolled up by forming them by a thin flexible material. FIG. 17 is a perspective view showing a structure in which the waveguide array 20 and the light extracting means 30 are formed by a thin flexible material in another embodiment of the displaying device of the present invention. For example, when the thickness added the waveguide array 20 and the light extracting means 30 is made to be about 0.7 mm, they can be rolled up in a cylinder type container with about 14 mm inside diameter by about 25 cm of their length.

A very small size light emitting means 10 with about 0.7 to 2 mm thickness and about 1 to 2 mm width can be realized by using a poly-Si TFT technology and an organic EL technology. Therefore, as shown in 17, the light emitting means 10 can be disposed at the rolling up center of the waveguide array 20 and the light extracting means 30. And in FIG. 17, the light reflecting means 40 can be disposed at the rolling up center by changing the positions of the light emitting means 10 and the light reflecting means 40. In this case, the power supply must be connected to the light emitting means 10, positioned at the place of the light reflecting means 40 in FIG. 17, by using wires.

This kind of displaying device, which can be contained in a small cylinder type container, is very convenient, when this is carried in such as a breast pocket. Recently, a radio circuit, a CPU, and a memory installing in a mobile communication terminal have been small sized. And when these circuits can be contained in a volume being about a pen point, a pen type mobile communication terminal can be expected to realize by combining with this displaying device of the present invention. The present invention can realize a technology, in which a display of various kinds of equipment can be contained in a small container for not only the mobile communication terminal but also for various mobile instruments. Therefore, the size and shape of the mobile equipment can be changed dramatically by the present invention.

This displaying device, which can be rolled up, can be applied to a large size displaying apparatus such as a curtain size displaying apparatus. In this case, it becomes easy to contain and carry the displaying apparatus, and an image projecting instrument like a projector becomes unnecessary, and this kind of effect can be realized by the present invention. Further, it is possible that this displaying device remains in a rolled up state when images are not displayed like a screen of the projector.

FIG. 18 is a perspective view showing a structure in which a detecting means (section) is provided at an entrance of the small container in which the waveguide array 20 and the light extracting means 30 are rolled up in another embodiment of the displaying device of the present invention. In FIG. 18, a black and white pattern 81 is formed on a part of the displaying region 30a of the displaying device that can be rolled up. A photocoupler 82 is provided at the position near the entrance of the small container, and the pulled out distance of the displaying device is detected by reading the black and white pattern 81 by the photocoupler 82. Actually, light emitted from an LED 83 in the photocoupler 82 hits the black and white pattern 81 and light reflected from the black and white pattern 81 is inputted to a phototransistor 84 in the photocoupler 82. It is judged, on which part of the black and white pattern 81 the light hit, by the output from the phototransistor 84, and the, photocoupler 82 measures the distance.

The light extracting means 30 extracts light only form a region corresponding to the distance measured by the photocoupler 82. With this, in case that an image is displayed on a region where a part of the displaying region 30*a* was pulled out, the power consumption at a region where was not pulled out can be decreased.

FIG. 19 is a perspective view showing a structure in an embodiment used a different material of the displaying device of the present invention. In order to extract light at the light extracting means 30, the liquid crystal layer 31 was used in the first and second embodiments. However, in this embodiment, as shown in FIG. 19, the liquid crystal layer 31 was replaced by a polymeric material layer used such as an electric field alignment polymer or a liquid crystal polymer.

The changing amount of the refractive index of these materials is smaller than that of the liquid crystal layer 31 by more than one digit, however, the refractive index is changed corresponding to the external electric field. Therefore, these materials can be used as a part of the light extracting means 30. This polymeric material layer 31*b* can be formed directly on the waveguide array 20 by a method such as the spin coating method, and further the electrodes 34 can be formed on the polymeric material layer 31*b*. Consequently, the liquid crystal sealing layer 32 and the transparent substrate 33 shown in FIG. 4 are not required. Therefore, in the structure, in which the light extracting means 30 is formed by using these kinds of polymeric materials, the displaying device can be made to be thinner, compared with the structure using the liquid crystal layer 31, and its manufacturing process can be simplified, this is an advantage. However, since the changing amount of the refractive index is small, there is a case that the light extracting efficiency is decreased depending on the designing of the direction of light emitted from the light emitting means 10 and its displaying luminance is decreased, compared with the structure using the liquid crystal layer 31.

As mentioned above, the present invention has following effects.

First, the power consumption of the displaying device of the present invention can be reduced by its line-by-line driving. In the structure of the present invention, a specific line in the displaying region is selected and light is extracted from plural waveguides crossing to the selected specific line. Therefore, the power consumption of the displaying device can be reduced largely, compared with the conventional structure in which light is extracted by selecting each waveguide in a displaying pixel unit.

For example, in case that a color image with a VGA format (the number of pixels is 640×480×3=921,600) is displayed at the frame frequency of 60 Hz, light is extracted from each waveguide in parallel. Therefore, the frequency of a voltage signal applying to electrodes of the light extracting means can be reduced to 1/680 of the conventional structure.

On the other hand, the time writing video signals to the light emitting means is 1/(60×480×3) sec.=11.6 μsec. per 1 line, that is, 18 nsec. per 1 light emitting element. Therefore, the driving frequency for the light emitting means is not decreased. However, the load at charging and discharging at this frequency is decided by the circuits shown in FIGS. 11 and 14. This load is fairly small compared with the conventional structure which needs to charge and discharge electrodes formed from the beginning to the end of the displaying region. Therefore, the power consumption in the whole displaying device is reduced largely, and this displaying device can give an advantage to equipment, in which low power consumption is prerequisite, such as a PDA and a note type PC.

Second, the displaying device of the present invention can decrease the deterioration of the contrast of the displayed image. As shown in FIG. 5, light inputted from the outside is absorbed at a light absorbing means. Further, an antireflection layer is provided on the surface of the light extracting means, and the light reflecting on this surface can be decreased. Consequently, the deterioration of the contrast being the problem in the conventional displaying device, caused by adding the reflected light from the structural elements of the conventional displaying device to the original video signal, can be reduced in the present invention.

Third, even a case that a remarkable light loss exists inside the waveguides, a high quality image can be displayed in the present invention. Corresponding to the light loss inside the waveguides, the light extracting efficiency can be corrected by making the array pitch of electrodes at the line far from the light emitting means in the light extracting means large. Or the gray level difference caused by the light loss inside the waveguides can be cancelled by correcting the video signals.

Fourth, the displaying device of the present invention can be contained in a small container and carried easily. The waveguide array and the light extracting means are made of a thin flexible material, and the structure, in which they can be rolled up in a small container, is used. With this, a displaying device, which can be contained in a small container and carried easily when not in use, can be realized.

Fifth, since the waveguide array and the light extracting means can be manufactured easily, the displaying device of the present invention can be manufactured in a low cost. Because, the light extracting means is formed by disposing the liquid crystal layer between the substrate having electrodes and the waveguide array. Therefore, compared with the conventional structure, in which many optical fibers are arrayed and a supper-lattice structure is adopted, the structure of the present invention is simple and can be manufacture in a low cost.

Sixth, the displaying device of the present invention can make its power consumption low, because light can be extracted from the liquid crystal layer by a low voltage The alignment of the liquid crystal can be changed by a low voltage, by making the array pitch of the electrodes narrow.

Seventh, the displaying device of the present invention can be manufactured in a low cost and can be made to be small, because the structure of the light emitting means includes TFTs. After forming circuits for driving light emitting elements by using TFTs on a substrate, the light emitting elements used an organic EL material are formed on the same substrate. Therefore, a process, connecting the light emitting elements and driving circuits, manufactured separately at the conventional displaying device, does not need in the present invention. Consequently, increasing the manufacturing cost, decreasing its yield rate, and deteriorating the reliability can be prevented in the present invention.

Eighth, as explained in the second embodiment, the displaying device of the present invention can be driven by digital signals. Therefore, a displaying device, which is strong against noise, can be realized, and further, an analog to digital converter does not need in this displaying device. This signifies that even when characteristics of TFTs, which drive the light emitting elements, do not have uniformity, a high quality image can be displayed. The resistance value of the Tr1 shown in FIG. 14, at the time when the Tr1 is in a conductive state, can be set to a value being several digits smaller than the resistance value of the LED. Therefore, even when the characteristics of the Tr1s have dispersion in the light emitting elements, uniform emitting light can be obtained.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A displaying device, comprising:
    a light emitting means that emits light of one line of a displaying image by plural light emitting elements,
    a waveguide array that propagates light inputted from said light emitting means from one end to the other end of a displaying region; and
    a light extracting means that extracts light propagating in said waveguide array from an arbitrarily selected region;
    wherein the light which is propagated through a waveguide array is extracted by said light extracting means to illuminate a display.

2. A displaying device in accordance with claim 1, wherein: said arbitrarily selected region includes at least two or more pixels.

3. A displaying device in accordance with claim 1, wherein:
    said arbitrarily selected region is an arbitrary one line crossing to the propagating direction of said light of said one line emitted from said light emitting means.

4. A displaying device in accordance with claim 1, wherein:
    said waveguide array, comprising:
    at least high refractive index regions and low refractive index regions, wherein:
    said high refractive index regions are provided corresponding to the number of pixels composing said one line of said light emitting from said light emitting means in a designated array pitch, and
    said light of said one line emitted from said light emitting means propagates in said corresponding high refractive index regions.

5. A displaying device in accordance with claim 1, wherein:
    said waveguide array is formed by a polymeric material.

6. A displaying device in accordance with claim 1, wherein:
    said waveguide array, further comprising:
    a light absorbing layer for absorbing light from the outside on a supporting substrate.

7. A displaying device in accordance with claim 1, wherein:
    said waveguide array, further comprising:
    a supporting substrate made of a polymeric material;
    a light absorbing layer for absorbing light from the outside formed on said supporting substrate;
    a low refractive index region formed on said light absorbing layer; and
    a layer, in which high refractive index regions and low refractive index regions are disposed alternately in a designated pitch, on said low refractive index region.

8. A displaying device in accordance with claim 1, wherein:
    said light extracting means, comprising:
    an antireflection layer for preventing light from the outside from reflecting.

9. A displaying device in accordance with claim 1, wherein:
    said light extracting means, further comprising:
    an optical material layer whose refractive index is changed by an external electric field; and
    plural electrodes for generating an electric field by selecting a region of said optical material layer.

10. A displaying device in accordance with claim 9, wherein:
    said plural electrodes are disposed so that a potential difference is generated in a region composing an arbitrary one line crossing to the propagating direction of said light of said one line emitted from said light emitting means.

11. A displaying device in accordance with claim 9, wherein:
    said plural electrodes are composed of a pair of stripe-shaped electrodes, and one piece of said stripe-shaped electrodes has plural branches.

12. A displaying device in accordance with claim 9, wherein:
    said region where an electric potential is given by said plural electrodes makes light emitted from said light emitting means extract to the outside from said optical material layer through said waveguide array, by changing the refractive index of said optical material layer at said region.

13. A displaying device in accordance with claim 9, wherein:
    said plural electrodes are formed on the same plane surface.

14. A displaying device in accordance with claim 12, wherein:
    said light extracting means, further comprising:
    a light scattering layer for scattering said light extracted from said optical material layer.

15. A displaying device in accordance with claim 9, wherein:
    said light extracting means, further comprising:
    an antireflection layer for preventing light from the outside from reflecting.

16. A displaying device in accordance with claim 1, wherein:
    said light extracting means corrects the light extracting efficiency at the time when said light is extracted corresponding to a loss of said light in said waveguide array.

17. A displaying device in accordance with claim 1, wherein:
    said waveguide array and said light extracting means are formed by a flexible material that can be repeatedly rolled up and pulled out, and can be contained in a container.

18. A displaying device in accordance with claim 17, further comprising:
    a detecting section that detects the boundary between the pulled out part being the exposed part from said container and the contained part in said container of said waveguide array and said light extracting means, wherein:
    said light extracting means extracts light from only a region of said exposed part base on said detected result.

19. A displaying device in accordance with claim 1, wherein:

said light emitting means, comprising:

organic electro-luminescence (EL) layers for emitting light, wherein;

each of said organic EL layers is positioned between a transparent electrode and an opaque electrode.

20. A displaying device in accordance with claim 19, wherein:

said light emitting means, further comprising:

a transparent substrate;

a light shielding layer for shielding light from the outside provided on said transparent substrate;

a barrier layer for preventing impurity elements including in said transparent layer from entering other layers provided on said barrier layer; and thin film transistors (TFTs) provided on said barrier layer.

21. A displaying device in accordance with claim 19, wherein:

said light emitting means provides said plural organic EL layers and TFTs for driving said plural organic EL layers corresponding to the number of pixels composing one line of emitting light.

22. A displaying device in accordance with claim 19, wherein:

said light emitting means, further comprising:

plural capacitors in which an inputted analog image signal is stored every pixel composing said one line; wherein:

when said analog image signal of said one line was stored in said plural capacitors, voltages stored in said capacitors are applied to gate electrodes of said TFTs at the same time, and said organic EL layers emit light of said one line at the same time.

23. A displaying device in accordance with claim 1, wherein:

said light emitting means inputs light of three colors R, G, and B to said waveguide array.

24. A displaying device in accordance with claim 1, wherein:

said light emitting means inputs a corrected image signal to said waveguide array corresponding to a loss of said light in said waveguide array.

25. A displaying device, comprising:

a light emitting means that emits light of one line of a displaying image by plural light emitting elements;

a waveguide array that propagates light inputted from said light emitting means from one end to the other end of said waveguide array; and a light extracting means that extracts light propagating in said waveguide array from an arbitrarily one line crossing to the propagating direction of one line of said light emitted from said light emitting means, wherein:

said light extracting means, comprising:

a gray level controlling region which makes a part of light propagating through said waveguide array leak to the outside; and a displaying region from which light controlled at said gray level controlling region is extracted.

26. A displaying device in accordance with claim 25, wherein:

said light extracting means, further comprising:

an antireflection layer for preventing light from the outside from reflecting.

27. A displaying device in accordance with claim 25, wherein:

said light extracting means, further comprising:

an optical material layer whose refractive index is changed corresponding to an electric field from the outside; and plural electrodes for generating an electric field by selecting a region of said optical material layer.

28. A displaying device in accordance with claim 27, wherein:

said plural electrodes disposed at said gray level controlling region are positioned so that a potential difference is generated at a region of an area based on an inputted digital image signal.

29. A displaying device in accordance with claim 25, further comprising:

a light absorbing section for absorbing light leaked from said gray level controlling region.

30. A displaying device in accordance with claim 27, wherein:

said plural electrodes disposed at said displaying region are positioned so that a potential difference is generated in a region composing an arbitrary one line crossing to the propagating direction of light of one line emitted from said light emitting means.

31. A displaying device in accordance with claim 30, wherein:

said plural electrodes are composed of a pair of stripe-shaped electrodes, and one piece of said stripe-shaped electrodes has plural branches.

32. A displaying device in accordance with claim 27, wherein:

said plural electrodes are formed on the same plane surface.

33. A displaying device in accordance with claim 27, wherein:

at said region where said electric potential was given from said plural electrodes, said refractive index of said optical material layer is changed, and said light emitted from said light emitting means is extracted from said optical material layer through said waveguide array to the outside.

34. A displaying device in accordance with claim 27, wherein:

said light extracting means, further comprising:

a light scattering layer for scattering said light extracted from said optical material layer.

35. A displaying device in accordance with claim 27, wherein:

said light extracting means, further comprising:

an antireflection layer for preventing light from the outside from reflecting.

36. A displaying device in accordance with claim 25, wherein:

said light extracting means corrects the light extracting efficiency at the time when said light is extracted corresponding to a loss of said light in said waveguide array.

37. A displaying device in accordance with claim 25, wherein:

said light emitting means, comprising:

organic EL layers for emitting light, wherein:

each of said organic EL layers is positioned between a transparent electrode and an opaque electrode.

38. A displaying device in accordance with claim 37, wherein:
said light emitting means, further comprising:
a transparent substrate;
a light shielding layer for shielding light from the outside provided on said transparent substrate;
a barrier layer for preventing impurity elements including in said transparent layer from entering other layers provided on said barrier layer; and
TFTs provided on said barrier layer.

39. A displaying device in accordance with claim 37, wherein:
said light emitting means provides said plural organic EL layers and said TFTs for driving said plural organic EL layers corresponding to the number of pixels composing one line of emitting light, and
said TFTs are driven from the beginning of said one line in order, and
said plural organic EL layers emit light from the beginning of said one line in order.

40. A displaying device in accordance with claim 25, wherein:
said light emitting means inputs light of three colors R, G, and B to said waveguide array.

41. A displaying device in accordance with claim 25, wherein:
said light emitting means inputs a corrected image signal to said waveguide array corresponding to a loss of said light in said waveguide array.

42. A displaying device in accordance with claim 25, wherein:
said waveguide array, comprising:
at least high refractive index regions and low refractive index regions, wherein:
said high refractive index regions are provided corresponding to the number of pixels composing one line of light emitting from said light emitting means by a designated array pitch, and
light of one line emitted from said light emitting means is propagated in said corresponding high refractive index regions.

43. A displaying device in accordance with claim 25, wherein:
said waveguide array is formed by a polymeric material.

44. A displaying device in accordance with claim 25, wherein:
said waveguide array, further comprising:
a light absorbing layer for absorbing light from the outside on a supporting substrate.

45. A displaying device in accordance with claim 25, wherein:
said waveguide array, further comprising:
a supporting substrate formed by a polymeric material;
a light absorbing layer for absorbing light from the outside formed on said supporting substrate;
a low refractive index region formed on said light absorbing layer; and
a layer in which high refractive index regions and low refractive index regions are disposed alternately in a designated pitch on said low refractive index region.

46. A displaying device in accordance with claim 25, further comprising:
a light reflecting section for reflecting light propagated by said waveguide array at the other end of said waveguide array.

47. A displaying device in accordance with claim 25, wherein:
said waveguide array and said light extracting means are formed by a flexible material that can be repeatedly rolled up and pulled out, and can be contained in a container.

48. A displaying device in accordance with claim 25, further comprising:
a detecting section that detects the boundary between the pulled out part being an exposed part from said container and the contained part in said container of said waveguide array and said light extracting means, wherein:
said light extracting means extracts light from only a region of said exposed part base on said detected result.

49. A displaying method, comprising the steps of:
emitting light of one line of a displaying image by plural light emitting elements;
propagating emitted light from one end to the other end of a displaying region through a waveguide array; and
extracting said propagating light from an arbitrarily selected region;
wherein the light which is propagated through a waveguide array is extracted by said light extracting means to illuminate a display.

50. A displaying method in accordance with claim 49, wherein:
said arbitrarily selected region includes at least two or more pixels.

51. A displaying method in accordance with claim 49, wherein:
said arbitrarily selected region is an arbitrary one line crossing to the propagating direction of one line of said emitted light.

52. A displaying method in accordance with claim 49, wherein:
said extracting said propagating light, comprising the steps of:
generating a potential difference at a designated region of an optical material layer, whose refractive index is changed corresponding to an external electric field of said waveguide array in which light is propagating; and
changing said refractive index of said optical material layer by generating said potential difference.

53. A displaying method in accordance with claim 49, wherein:
said extracting said propagating light, further comprising the step of:
correcting light extracting efficiency at the time when said light is extracted corresponding to a loss of said light in said waveguide array.

54. A displaying method in accordance with claim 49, further comprising:
reflecting light that was propagated in said waveguide array at the other end of said displaying region.

55. A displaying method in accordance with claim 49, wherein:
said emitting light, comprising the steps of:
storing an inputted analog image signal in capacitors, every pixel composing one line of said inputted analog image signal;
applying said analog image signal to gate electrodes of TFTs at the same time, when said one line of said analog image signal was stored in said capacitors; and making organic EL layers of said one line connecting to source-drain electrodes of said TFTs emit light at the same time.

56. A displaying method in accordance with claim 49, wherein:

at said emitting light, three colors of R, G, and B are emitted.

57. A displaying method in accordance with claim 49, wherein:

at said emitting light, light is emitted based on a corrected image signal corresponding to a loss of said light in said waveguide array.

58. A displaying method, comprising the steps of:

emitting light of one line of a displaying image by plural light emitting elements;

propagating said emitted light from one end to the other end of a waveguide array;

leaking a part of said propagating light at a gray level controlling region; and extracting light controlled at said gray level controlling region from an arbitrarily one line crossing to the propagating direction of one line of said light.

59. A displaying method in accordance with claim 58, further comprising the step of:

absorbing light leaked at said gray level controlling region.

60. A displaying method in accordance with claim 58, wherein:

said leaking light and said extracting light, comprising the steps of:

generating a potential difference at a designated region of an optical material layer, whose refractive index is changed corresponding to an external electric field of said waveguide array in which light is propagating; and changing said refractive index of said optical material layer by generating said potential difference.

61. A displaying method in accordance with claim 58, wherein:

said leaking light and said extracting light, comprising the step of:

generating a potential difference at a region of an area based on an inputted digital image signal.

62. A displaying method in accordance with claim 58, wherein:

said extracting light, further comprising the step of:

correcting light extracting efficiency at the time when said light is extracted corresponding to a loss of said light in said waveguide array.

63. A displaying method in accordance with claim 58, wherein:

said emitting light, comprising the steps of:

driving switching elements provided corresponding to pixels composing one line of emitting light from one end of said one line in order; and making organic EL layers connecting to one end of said switching elements emit light from said one end in order.

64. A displaying method in accordance with claim 58, wherein:

at said emitting light, three colors of R, G, and B are emitted.

65. A displaying method in accordance with claim 58, wherein:

at said emitting light, light is emitted based on a corrected image signal corresponding to a loss of said light in said waveguide array.

66. A displaying method in accordance with claim 58, further comprising the step of:

reflecting light that was propagated in said waveguide array at the other end of said displaying region.

67. A manufacturing method of a displaying device, comprising the steps of:

forming a light emitting section that emits light of one line of a displaying image by plural light emitting elements;

forming a waveguide array that propagates light emitted from said light emitting section from one end to the other end of a displaying region; and forming a light extracting section that extracts said propagating light from an arbitrarily selected region;

wherein the light which is propagated through a waveguide array is extracted by said light extracting means to illuminate a display.

68. A manufacturing method of a displaying device in accordance with claim 67, wherein:

said forming said waveguide array, comprising the step of:

forming a photosensitive acrylic resin having a polymer property on all surface of a supporting substrate made of a material having a polymer property by a spin coating method.

69. A manufacturing method of a displaying device in accordance with claim 68, wherein:

said forming said waveguide array, further comprising the steps of:

forming high refractive index regions by exposing and etching said photosensitive acrylic resin coated on said supporting substrate;

forming low refractive index regions by coating a low refractive index material having a polymer property on said supporting substrate on which said high refractive index regions were formed by the spin coating method; and exposing the upper surfaces of said high refractive index regions by polishing the coated surface.

70. A manufacturing method of a displaying device in accordance with claim 68, wherein:

said forming said light extracting means, comprising the steps of:

forming a light scattering layer by a light scattering material having a polymer property on a transparent substrate having a plastic property;

coating a transparent electrode material on all surface of said transparent substrate on which said light scattering layer was formed by a spattering method;

forming plural electrodes by exposing and etching said transparent substrate on which said transparent electrode material was coated;

coating polyimide on all surface of said supporting substrate on which said plural electrodes were formed by the spin coating method;

forming an alignment layer by heating and rubbing said coated polyimide; and forming a liquid crystal layer on said supporting substrate on which said alignment layer was formed.

71. A manufacturing method of a displaying device in accordance with claim 67, wherein:

said forming said light extracting means, further comprising the steps of:

forming an optical material whose refractive index is changed corresponding to an external electric field on said waveguide array; and forming plural electrodes on said optical material.

72. A manufacturing method of a displaying device in accordance with claim 67, wherein:

said forming said light emitting section, comprising the steps of:

forming TFT driving circuits for driving said light emitting elements on a transparent substrate having a glass property; and forming said light emitting elements on said transparent substrate on which said TFT driving circuits were formed.

73. A manufacturing method of a displaying device in accordance with claim 67, wherein:

said light omitting elements are organic EL elements.

74. A manufacturing method of a displaying device in accordance with claim 67, wherein:

said forming said light emitting section, comprising the steps of:

forming TFT driving circuits for driving said light emitting elements on a transparent substrate having a glass property;

forming a planarization layer for making the surface of said transparent substrate on which said TFT driving circuits were formed plane by using a transparent insulating material;

forming transparent electrodes that connect said TFT driving circuits and said light emitting elements by opening contact holes at a part of said planarization layer;

forming organic EL layers on said transparent electrodes;

forming opaque electrodes on said organic EL layers; and forming a sealing layer for covering all of said transparent electrodes.

* * * * *